United States Patent Office 3,471,252
Patented Oct. 7, 1969

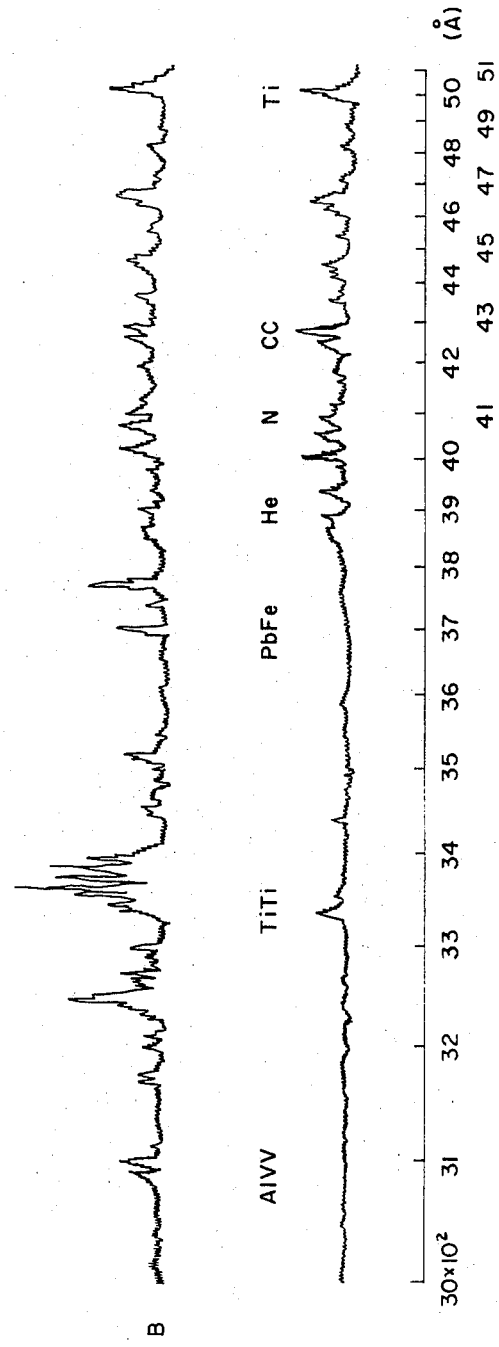

3,471,252
PROCESS FOR THE PREPARATION OF TITANIUM COMPOUNDS WHICH ARE SUBSTANTIALLY FREE FROM METALLIC IMPURITIES
Yujiro Sugahara, Tokyo, and Koichi Usui, Hiroyuki Naito, and Masao Sakamoto, Tsuruoka-shi, Japan, assignors to Mizusawa Kagaku Kogyo Kabushiki Kaisha, Osaka, Japan, a corporation of Japan
Filed Jan. 17, 1967, Ser. No. 609,918
Claims priority, application Japan, Jan. 22, 1966, 41/3,322, 41/3,323, 41/3,324
Int. Cl. C01g 23/00, 23/04; B01j 13/00
U.S. Cl. 23—105                                   10 Claims

ABSTRACT OF THE DISCLOSURE

Process for the preparation of titanium compound such as titanium phosphate free of metallic impurities e.g. vanadium, iron, which comprises mixing titanium salt with phosphorus oxoacid in the presence of water to form a liquid mixture composed mainly of titanium salt of phosphorus oxoacid, shaping the mixture into granular gel, and thereafter extracting from the granular gel said metallic impurities.

---

This invention relates to the preparation of refined, white titanium compounds.

More particularly, the invention relates to a process for the preparation of substantially refined gel containing titanium salt of phosphorus oxoacid, titanium salt of phosphorus oxoacid, titanium hydroxide or titanium oxide from inorganic or organic acid solutions of titanium compounds containing metallic impurities, or directly from such titanium compounds or amorphous oxides of titanium.

Titanium oxide and titanium phosphate are well known for their use as white pigment. Commercially available such white pigments however are not entirely satisfactory as to their whiteness. It is because of the trace of impure metallic components present in the material titanium compounds carried over to the titanium oxide or titanium phosphate. For example, according to Reijiro Uriu (Pigment (Ganryo), vol. 5, pp. 477, 1961), it is reported that the presence of such metals as Fe, Mo, Co, V, Cr, Mn, etc. in titanium oxide in such trace amount even at 0.0005% produces noticeable effect on the color tone of the product. And, with techniques of the contemporary level, it has been difficult to substantially remove such trace amount of metallic impurities. Among those metallic impurities, vanadium component is particularly difficult of isolation and removal, whereas according to our researches the undesirable coloring ranging from light yellow to dark brown often observed in conventional titanium oxide is produced mainly by the trace of vanadium component contained therein.

Known methods for titanium oxide preparation may be divided into two broad classes, i.e., sulfate process and chloride process. As a few specific examples, there are proposed:

(a) A process for the preparation of high purity titanium dioxide in which titanium sulfate solution obtained by sulfuric acid treatment of titanium ore is hydrolyzed under heating to precipitate hydrate of titanium dioxide, which is washed and again dissolved in sulfuric acid, followed by another hydrolysis under heating [C.A. 63, 10174 (1965)];

(b) A process for treating titanium tetrachloride with mineral oil and titanium trichloride to reduce its VOCl$_3$ content to 0.01%. [Fr. P. 1,393,928; C.A. 63, 14415 (1965)]; and (c) A process for the preparation of titanium dioxide in which titanium is refined and recovered in the form of potassium chlorotitanate or ammonium chlorotitanate, which is then thermally decomposed (U.S.P. 2,857,242).

In the above process (a), titanium dioxide is refined by hydrolysis repeated twice with sulfuric acid, but the titanium dioxide obtained by the first hydrolysis with sulfuric acid still contains 100–300 p.p.m. of vanadium (V), and furthermore it is extremely difficult to dissolve that titanium dioxide again in sulfuric acid, a very large quantity of sulfuric acid being required, and therefore is objectionable as industrial scale operation. Moreover, with the process (a) it is impossible to reduce the V content of the product to less than several p.p.m., with all those cumberstone procedures.

Again the above process (b) requiring as the starting material titanium tetrachloride of considerably high purity, still the VOCl$_3$ content of the product is reducible to the order of 0.01%. The process (c) also comprises many operational steps with little effect for reducing V content.

The object of the present invention resides in, therefore, the provision of a process for producing high purity titanium compounds with few steps and simple operations using low cost equipments, even from lean ore of low titanium content containing much impurities.

Further object of the invention resides in the provision of titanium salt of phosphorus oxoacid, titanium hydroxide or titanium oxide which are substantially perfectly free from metallic impurities and themselves useful as white pigment, and furthermore are useful as the highest purity titanium material for other titanium compounds.

Other objects and advantages of the invention will become apparent upon reading the following descriptions.

According to the invention, the above objects are accomplished by a process for the preparation of titanium compounds which are substantially free from metallic impurities, comprising mixing inorganic or organic acid solution of titanium compound containing metallic impurities, such titanium compound itself, or amorphous oxide of titanium with phosphorous oxoacid or derivative thereof which will produce phosphorus oxoacid under the reaction conditions, in the presence of water, thereby forming a liquid mixture composed chiefly of titanium salt of phosphorus oxoacid, converting the same to granular gel, and thereafter extracting the metallic impurities from the said gel.

Hereinafter the invention will be explained in full details.

Preparation of the starting material

In the invention, titanium salts, amorphous oxides of titanium or inorganic or organic acid solutions or aqueous solutions thereof of titanium compounds containing various metallic impurities are used as the starting material. The acid solutions of the titanium material are obtained by elution of titanium contained in titanium salts or various titanium-containing ores into inorganic acids other than phosphorus oxoacid, organic acids or aqueous solutions thereof. Accordingly, in the invention any inorganic acid other than phosphorus oxoacid, organic acid, or aqueous solution thereof, can be used for the preparation of the starting solution, so far as it can dissolve titanium in titanium salts or titanium-containing ores.

As the ores, any type such as ilmenite, iron sand slag, rutile and high titanium slag may be used so far as it contains titanium, and also as titanium salts, any acid-soluble titanium salt such as gaseous or liquid titanium salt as titanium tetrachloride (TiCl$_4$), or titanyl sulfate (TiOSO$_4$), can be used. The titanium salts as above may also be used as the starting materials as they are. Incidentally, the chief components of the above-named ores are as follows:

| Ore: | Main composition, percent |
|---|---|
| Ilmenite: | |
| $TiO_2$ | 40–60 |
| FeO | 9–40 |
| $Fe_2O_3$ | 7–25 |
| $SiO_2$ | Not appreciable |
| Iron sand slag: | |
| $TiO_2$ | 20–35 |
| $SiO_2$ | 20–25 |
| CaO | 20–25 |
| $Fe_2O_3$ | About 2–4 |
| Rutile: | |
| $TiO_2$ | About 94–98 |
| $Fe_2O_3$ | 0.5–2 |
| $SiO_2$ | 1–2 |
| High-titanium slag: | |
| $TiO_2$ | 70–80 |
| FeO | 7–10 |
| $SiO_2$ | Not appreciable |

Chief components of titanium-containing ores being, for example, as shown in the above, these ores and titanium salts contain each minor amount of many other metallic impurities such as Mo, V, Co, Cr, Mn, Pb, Al, Ca, etc. In the specification, among such various metals or metallic compounds other than titanium as above, those of which presence in the product is undesirable are referred to as metallic impurities.

In the invention, at least one of such titanium-containing ores and titanium salts is treated with an inorganic acid other than phosphorus oxoacid or an organic acid or aqueous solution thereof, thereby forming an acid solution of titanium compound containing metallic impurities, which is used as the starting solution. Therefore, in the invention such acid solutions of titanium-containing ores side-produced in titanium industry can be used as the starting solutions as they are. As the acids useful for dissolving the titanium materials, for example, inorganic acids such as sulfuric, sulfurous, hydrochloric, perchloric, chloric and nitric acids, organic acids such as oxalic, formic and methanesulfonic acids, or aqueous solutions thereof, may be named. When titanium ore or titanium compound is dissolved in such acid or aqueous solution thereof, the titanium component elutes into the acid or aqueous solution thereof in the form of a salt with the acid radical of the acid employed, and at that time the metallic impurities such as iron and minor amounts of Mo, Co, Cr, Mn, etc. also elute concurrently. Therefore in order to recover the titanium component in the titanium ore or titanium salt as high purity titanium compound, the metallic impurities must be removed from the said inorganic or organic acid solution which is the starting material in the invention with the maximum degree possible of perfection. Incidentally, the concentration of the acid employed for preparation of the starting solution is not critical, any concentration at which titanium in the titanium ore or titanium salt can be dissolved thereinto being useful. It can be readily empirically determined in accordance with the type of the ore or titanium salt employed. Citing a few specific examples, when sulfuric acid is used as a mineral acid, with iron sand slag the concentration of the former may range approximately 5–98%, and about 20–98% with ilmenite, rutile and high-titanium slag. However iron sand slag containing a considerable amount of $SiO_2$, it is preferred to elute its titanium component without gelling $SiO_2$, and for this reason use of 5–40% sulfuric acid is recommended.

Taking the case of organic acid, for example 5–90% aqueous oxalic or methanesulfonic acid can be used for dissolving iron sand slag, ilmenite and high-titanium slag. Again two or more of those inorganic and organic acids may be concurrently used as mixed. The concentrations and types of the acids can be readily determined empirically.

The dissolving may be performed at the temperatures ranging from room temperature to boiling point. Whereas in case of iron sand slag it is preferably performed at around room temperature to 90° C., so as to avoid gelling of $SiO_2$. Preferred concentration of hydrochloric acid is 5–30%, and that of nitric acid, 15–40%. The percentages are all by weight, and unless otherwise indicated, this is true throughout the specification. Generally the quantities of those acids for use advantageously range, in terms of acid radical, 0.8–3 equivalents to the basic component in the titanium ore or titanium salt (e.g. Ti, Fe, Mg, Al, Ca etc.), in case of titanium salt its anion being included in the acid radical, to produce acid solution of titanium at easily manageable concentrations.

In preparing the starting solution of the invention, if insoluble residue or precipitate is formed when the titanium ore or titanium salt is dissolved in acid or aqueous solution thereof, its removal is recommended. Again when the ore or salt contains a large amount of $SiO_2$, the $SiO_2$ may form sol in the acid solution, and in such a case it is desirable to gel the $SiO_2$ component by controlling the acid concentration or temperature of the solution, and to remove the gel, using the remaining acid solution as the starting material.

Furthermore, in the subject process it is also possible to use amorphous oxides of titanium as the starting material. The term "amorphous" employed in the claims and specification means the amorphous state in terms of X-ray diffractiometry as commonly referred to in crystallography. Generally titanium hydroxide [$Ti(OH)_4$] and intermediate oxides of titanium between titanium hydroxide and titanium oxide are amorphous in terms of X-ray diffractiometry, and therefore are useful as the "amorphous oxides of titanium" of the invention. Those amorphous oxides of titanium can be expressed by the formula $TiO_2 \cdot nH_2O$ ($n$ is a number greater than zero and no more than 2), and therefore they may be referred to as hydrous titanium oxide.

Thus in the invention, various amorphous oxides of titanium containing metallic impurities which are obtained as intermediate products or side products at various stages in titanium industry, for example, hydrous titanium oxide such as titanium hydroxide, can be advantageously used. Also such hydrous titanium oxide can be obtained through hydrolysis of aforesaid aqueous inorganic or organic acid solution of titanium salt or ore. The hydrolysis may be performed either (1) By heating the aqueous acid solution of titanium component under atmospheric or elevated pressure to the temperatures below the critical point of said solution, preferably 60–140° C., or (2) By neutralizing a part or whole of the free and combined acid in the aqueous acid solution with alkali, or (3) By diluting the aqueous acid solution of titanium component with water or heated water. The hydrous titanium oxide is obtained in the form of slurry or jellied mass in which the whole is gelled, depending on the concentration of titanium component in the aqueous acid solution or operational conditions of the hydrolysis. Generally speaking, with the heating hydrolysis as 1 above, the hydrous titanium oxide is obtained as slurry and with the procedures 2 and 3 the product tends to be obtained in the states ranging from slurry to gel blocks, depending on titanium concentration of the aqueous acid solution employed.

In the subject process, use of hydrous titanium oxide of the minimum possible free water content is preferred, and for this reason when it is obtained as slurry, it should preferably be subjected to solid-liquid phase separation step such as filtration, so that thereby separated gel of the hydrous titanium oxide be used. In that case, the gel may be optionally dried at elevated temperature such as, for example, below 600° C. Again, in case gel blocks of hydrous titanium oxide is obtained from the aforesaid hydrolysis by neutralization, the product may be suitably broken and dried before further treatments.

Formation of liquid mixture composed mainly of titanium salt of phosphorus oxoacid The titanium material as described in the foregoing is then mixed, in the presence of water, with phosphorus oxoacid or a derivative thereof which can produce phosphorus oxoacid radical in aqueous medium under the working conditions of the invention. Thus through complex reaction between the titanium component and phosphorus oxoacid or derivative thereof taking place in the aqueous medium, a liquid mixture composed mainly of titanium salt of phosphorus oxoacid is formed.

At that time the liquid mixture may be gelled after going through stable sol state, or immediately gelled to form slurry or an integrated, jellied mass, depending on the titanium concentration of the material employed and other reaction conditions.

In one of the preferred embodiments of the invention, such reaction conditions as will form from the reaction liquid first stable sol are selected as hereinafter explained, and the sol mixture is moulded while its gelling progresses to form wet or dry granular gel from which the metallic impurities are extracted and removed.

In another embodiment of the invention, the above material and phosphorus oxoacid or a derivative thereof which produces phosphorus oxoacid in aqueous medium under the working conditions of the invention are mixed in the presence of water, in such quantities that the tetravalent titanium compound concentration calculated as $TiO_2$ should become no lower than 4% of the liquid mixture formed. In that case the reaction is led so that the mixture should form a jellied mass optionally going through the stable sol stage, and the jellied gel is shaped into small blocks as later described which, either as wet gel as they are or dried to any desired degree, are subjected to the metallic impurities extraction step.

Furthermore, when the titanium concentration in the material employed, is relatively low, or when the amorphous titanium oxide is employed the liquid mixture of the material with phosphorus oxoacid or its derivative may form a slurry of titanium salt of phosphorus oxoacid gel. According to the invention, such slurry may be directly heated and dried into small, dry gel blocks or be separated from the excess liquid medium to form water-containing cake or jelly and thereafter shaped into small, wet gel blocks, from the dry or wet gel blocks so obtained the metallic impurities being extracted.

For the purpose of the invention any phosphorus oxy acid such as, for example, ortho-phosphoric acid ($H_3PO_4$), metaphosphoric acid ($HPO_3$), pyrophosphoric acid ($H_4P_2O_7$) hexametaphosphoric acid (($HPO_3)_6$), tripolyphosphoric acid ($H_5P_3O_{10}$), phosphorous acid ($H_3PO_3$) and hypophosphorous acid ($H_3PO_2$), may be used. Also in the invention those phosphorus oxoacids are not necessarily of high purity, but they may be crude acids containing impurities such as Fe, Al, Mg, Ca and V. Because, such metallic impurities are all removable in the later described extraction step in accordance with the invention. And as their derivatives, anhydrides of, for example, above-named phosphorus oxoacids (e.g. phosphorus pentoxide, etc.), halides or oxyhalides of phosphorus, or salts of alkali metals, alkaline earth metals, ammonium, zinc, aluminium, etc. may be used. Thus in accordance with the invention, in case as the derivatives of phosphorus oxoacids salts thereof are employed, not only water-soluble salts but also water-insoluble salts such as ore of phosphorus can be used. Of course, those derivatives may be of crude grade. Incidentally, in case water-insoluble salts are used, the reaction between the salts and oxides of titanium should be performed in the presence of free acid.

As to the amount of phosphorus oxoacid or a derivative thereof and mixing condition thereof with titanium material in an aqueous medium, the sole requirement is that they should be suitable for producing a liquid mixture composed mainly of titanium salt of phosphorus oxoacid as aforesaid. However, the amount of phosphorus oxoacid or a derivative thereof should preferably be sufficient to ultimately gel the all or substantially all of the titanium salt contained in the titanium material, and for this reason it is recommended that phosphorus should be present, per atom of titanium, at least 0.2 atomic equivalent, preferably 0.3 atomic equivalent or more but no more than 6 atomic equivalent, preferably no more than 4 atomic equivalent. Even within the above-specified range, use of too great an amount of phosphorus oxoacid or its derivative shows no substantially advantageous effect on the reaction and is economically objectionable. Whereas, too small an amount hinders smooth gel formation. Accordingly, it is particularly preferred to use phosphorus oxoacid or its derivatives in such an amount that about 0.3–2 atomic equivalent of phosphorus should be present per atom of titanium.

As so far described, in the invention the titanium material is mixed with a phosphorus oxoacid or its derivative in the presence of water to first form a liquid mixture composed mainly of titanium salt of the phosphorus oxoacid. To meet the requirement for the presence of water, the titanium material may contain water and/or the phosphorus oxoacid or its derivative may be in the form of aqueous solution or aqueous slurry at the time of mixing.

In order to form a stable liquid sol composed mainly of titanium salt of phosphorus oxoacid by mixing the aforesaid two in the presence of water in accordance with the preferred embodiment of the invention, generally, (a) In case free acid is present in the liquid mixture, the concentration thereof should be kept as low as possible, and (b) Mixing under high temperature should be avoided (low temperatures being preferred).

The above conditions however are not critical, but specific conditions can be empirically determined case by case depending on the relative relationship among type and concentration of the starting acid solution and type of the phosphorus oxoacid or its derivative employed. Normally once mixing the two, eventually gelling takes place after going through sol state when the mixture is only let stand, but in the invention it is particularly preferred to treat the liquid mixture (reaction liquid) while it is in the sol state to gel and granulate the same. Accordingly, it is sufficient for the mixture to maintain the sol state for the time as will permit its granulation, e.g. from the minimum of several seconds to 5 minutes. Of course longer maintenance of the sol state allows easier handling, whereas various granulation means may be selected depending on the duration of sol state as described below.

In the invention, "sol" refers to not only that in terms of colloid chemistry, but includes substances of considerably high viscosity so far as they maintain flowable liquid state under the treating conditions of the invention.

On the other hand, in order to form jellied gel composed mainly of titanium salt of phosphorus oxoacid from the liquid mixture in accordance with another embodiment of the invention, generally, (a) The tetravalent titanium compound concentration in the liquid mixture calculated as $TiO_2$ should be at least 4%, preferably 5% or higher;

(b) Free acid concentration in the liquid mixture should preferably be low; and (c) The mixing is preferably performed at room temperature or elevated temperatures.

Again the above conditions are not critical, but specific conditions can be empirically determined case by case depending on the relative relationship among type, titanium concentration and free acid concentration of the starting acid solution as well as type of the phosphorus oxoacid or its derivative employed. Normally once mixing the two materials, jellified gel may be formed without further treatment, but in most cases heating assists in the formation of jellied mass. Again when the titanium concentration is particularly high and furthermore the free acid concentration is also relatively high, in some cases jellied gel is immediately formed without going through the sol stage. In this embodiment of the invention, the initial state of the mixture is of no significance, so far as ultimately it takes the form of jellied gel. Incidentally, "jellied gel" said in the specification refers to the state in which the entire system forms liquid-containing, continuous or noncontinuous gel, leaving little or no free liquid.

Furthermore when titanium concentration in the liquid mixture is relatively low (although not critical, with that of less than 4% as $TiO_2$ the mixture tends to become slurry), the mixture may be gelled to slurry state after going through sol state when let stand as it is, but in certain cases such slurry-formed gel may be directly obtained. In the invention, "slurry" refers to the state in which free liquid and gel are separated to form two-phase system.

Granulation

According to the invention, the aforesaid liquid mixture composed mainly of titanium salt of phosphorus oxoacid is then shaped into granular gel. For convenience' sake this step is referred to as granulation step.

For example, when relatively stable sol state mixture is obtained in accordance with the preferred embodiment of the invention, it is shaped, during its gelling is under progress, into wet or dry granular gel.

As aforesaid, the sol gels of itself after lapse of certain period when let stand, but generally the gelling time can be shortened by such means as heating or suitably controlling the amount of free acid.

Therefore, in the granulation step, the sol can be formed into wet granular gel during its gelling, by such suitable means as (1) Pouring the sol state mixture into an immiscible liquid medium with agitation,
(2) Pouring the sol into such liquid medium as a streamlet or dropwise.
(3) Pouring the sol into a container or mould divided into small sections with partitions, or
(4) Pouring the sol onto belt conveyor or into or over a rotating drum.

At that time the product may be broken into smaller pieces if necessary. It is of course possible to accelerate the gelling at that time by such means as heating, controlling the amount of free acid or employing oxidizing atmosphere.

According to the invention, the sol state mixture may be formed into completely or incompletely dried granular gel by promoting its gelling while evaporating or freezing the reaction liquid with such means as, for example, (5) Supplying or spraying the sol into heated gaseous atmosphere or onto heated plate as a streamlet or small drops,
(6) Pouring the sol into heated container or mould, or onto heated conveyor, or
(7) Subjecting the sol to vacuum-drying or freeze-drying. In this case also the product may be broken if necessary.

In case the gelling fails to progress smoothly or after gelling a part of the reaction liquid becomes separated so the whole system is not jellified by such causes as low titanium concentration in the sol state mixture or presence of titanium therein in trivalent state cooperated with other conditions, suitably other means such as evaporation of liquid with heating or pressure reduction, or employment of oxidizing atmosphere, may be practiced, or granulation means as above (5), (6) and (7) may be suitably adopted to form dry granular gel.

Whereas, for the granulation of the afore-described jellied mass (gel) in accordance with another embodiment of the invention, any optional means such as (8) In case the jellied gel has considerably high form-retaining ability, merely breaking the same into desired size and shaping the pieces into suitable form as plate or flake,
(9) Extruding the same into rod form by means of an extruder (if necessary, further cutting or breaking the rod into suitable size) and moulding the same into suitable form,
(10) Moulding the same into suitable form such as film, plate, column, dice, tablet, sphere, etc. using a suitable moulding machine, and
(11) Heating or letting stand the same to form granules utilizing the shrinkage of the jelly itself, may be employed. During, before or after the moulding additional treatment such as heating or compressing may be given to the system.

Furthermore, when the gel of titanium salt of phosphorus oxoacid is obtained as slurry, it can be shaped into completely or incompletely dried granular gel by evaporating or freezing the reaction liquid with such means described in (5), (6) and (7) above. Again the slurry may be first converted to liquid-containing cake or jelly with the excess liquid removed by such suitable means as decantation, compression or evaporation, optionally followed by heating to further evaporate the excess liquid, and thereafter the product may be shaped into granules by such means as (8)–(11) above.

Thus wet or dry granular gel of varied forms such as of plate, flake, sphere, scale, column, prism, dice, sand or irregular pebbles is obtained. In the specification, all of these varied forms are included in the term "granular."

Extraction of metallic impurities

Then according to the invention the metallic impurities contained in the above granular gel are separated and removed by extraction by the means known per se.

For such extraction, varieties of means such as (1) water-washing
(2) diluted acid and/or strong acid treatment
(3) alkali treatment
(4) organic solvent treatment
(5) acidic organic solvent treatment
(6) treatment with complex-forming agent
(7) ion-exchange resin treatment
(8) dialysis (or electrodialysis)

may be employed. Of course two or more of the above means may be employed in combination.

When the titanium material contains relatively large amount of free acid and its metallic impurities contents are relatively low, washing with water alone achieves almost perfect extraction of the impurities. Particularly, metallic impurities other than vanadium are removable with water-washing to considerably satisfactory degree.

However, use of aqueous solution of an inorganic or organic acid achieves extraction and removal of the metallic impurities with still higher efficiency. For example, aqueous solution of any inorganic acid such as hydrochloric, sulfuric or nitric acid, phosphorus oxoacid such as phosphoric acid, sulfurous or chloric acid, or of any organic acid such as oxalic, acetic, formic, organic sulfonic, or organic phosphonic acid, etc., can be used.

Also those inorganic or organic acids may be used non-diluted or as concentrated aqueous solutions, among which aqueous solutions of strong acids being preferred.

Particularly, when treatment with a diluted aqueous solution in the order of say 0.1–10% concentration of any of the above acids is followed by another treatment with concentrated aqueous solution of the acid, all of the metallic impurities can be advantageously removed with little acid consumption. Of course water-washing may further follow.

Among the metallic impurities, vanadium is not simply removable with diluted acid treatment, but the same can be easily removed by such treatment in an oxidizing atmosphere or a treatment with concentrated solution of a strong acid or alkali, particularly strong alkali treatment in an oxidizing atmosphere. Accordingly, it is also possible to extract and remove the metallic impurities by diluted acid treatment followed by strong aqueous alkali solution treatment, or the order of the treatments may be reversed, preferably the later diluted acid treatment being performed in reducing atmosphere which can be provided, for example, by addition of a reducing agent such as hydrosulfite or use of reducing acid such as sulfurous acid. With such means almost all of the metallic impurities including Fe but excepting V are removable. It is of course desirable to perform water-washing or other suitable treatment between the alkali treatment and diluted or strong acid treatment. As alkali, caustic soda or caustic potash is preferred. Aqueous ammonia or lime water is also usable, but with such it is generally difficult to perfectly remove vanadium and therefore, treatment therewith should preferably be followed by caustic soda or caustic potash treatment.

When alkali treatment is thus given, the gel composed mainly of titanium salt of phosphorus oxoacid is converted to titanium hydroxide. According to the invention, therefore, when the extraction step is practiced, without employing alkali, by such means as acid treatment, water-washing or organic solvent treatment, gel of titanium salt of phosphorus oxoacid is obtained, and when an alkali treatment is given, titanium hydroxide is obtained. If the alkali treatment is insufficient, the titanium salt of phosphorus oxoacid is partly dephosphorized and mixd salt is formed.

The metallic impurities in the gel again can be removed with organic solvent such as methanol, ethanol, propanol, butanol, acetone, etc. or aqueous solutions thereof. In that case, the solvent or aqueous solution thereof may be used concurrently with an inorganic acid such as hydrochloric, sulfuric, nitric or phosphorus oxoacid or an organic acid such as acetic or oxalic acid, or an aqueous solution thereof.

The metallic impurities are likewise removable by extraction of the granular gel with a complex-forming agent such as, for example, tributylphosphate or ethylenediaminetetraacetic acid (EDTA) which forms complex with the metallic impurities, although not with titanium in the gel.

Furthermore, according to the invention it is also possible to extract and remove the metallic impurities using the techniques well known in the art such as the use of ion-exchange resin or dialysis.

In short, the extraction of the metallic impurities may be performed by any of the technique or combination of techniques known in the art. Also as to the apparatus, any known extraction apparatus may be employed, such as, for example, mixer settler, fixed bed or moving bed solid-liquid extraction apparatus using packed bed, continuous type horizontal rotatory extraction apparatus, filter press type dialysis apparatus, etc.

Thus according to the invention substantially all metallic components other than titanium can be removed by suitable selection or combination of extraction means as described in the above. Whereas, it is also possible, when presence of certain metal or metals, or metallic compounds in the product is considered desirable or at least not detrimental depending on the utility of the product, to allow such specific metal, metals or metallic compounds to remain while removing substantially all of the other undesirable metallic impurities. For an example, in case titanium salt of phosphorus oxoacid is used for white pigment in paper industry, in certain cases presence of gypsum ($CaSO_4$) is considered desirable or at least not detrimental. In that case by employing aqueous sulfuric acid in the acid treatment of the extraction step in accordance with the invention, the metallic compound can be left intact in the product. In such cases, for example, $CaSO_4$ is not regarded as "metallic impurities" in the specification. However, for some utilities of the product removal of $CaSO_4$ may be desirable. For that purpose then, for example, aqueous hydrochloric acid treatment may be satisfactorily employed as the extraction means. Furthermore, according to the invention it is also possible to cause presence of desired amount of desired type of metallic component than titanium in the product by suitably controlling the extraction means.

Post-treatment

The gel of titanium salt of phosphorus oxoacid or titanium hydroxide from which the metallic impurities are substantially removed by the process as described in the foregoing then may be optinally subjected to further water-washing or other post treatment and thereafter broken into particles of desired size while retaining the wet state.

Or, the same may be dried and thereafter broken if necessary. Thus dry product of gel titanium salt of phosphorus oxoacid or titanium hydroxide is obtained.

Or, the wet gel of titanium salt of phosphorus oxoacid, as it is or after optional drying, may be sent to a calcining oven to be baked at suitable temperatures above about 200° C. If the temperature of about 500° C., preferably above 700° C., is employed for the calcination, crystal titanium salt of phosphorus oxoacid is obtained. The product may be broken after the calcination if necessary.

Furthermore, when titanium hydroxide is obtained by the alkali treatment in the extraction step as aforesaid titanium dioxide ($TiO_2$) may be obtained therefrom by sending the wet or dry product to a calcining oven and calcining the same at about 500° C. or above, preferably above 600° C. The dioxide may be further suitably crushed.

Again according to the invention, the wet or dry gel of titanium salt of phosphorus oxoacid may further be treated with phosphorus oxoacid, aqueous solution thereof, aqueous solution of water-soluble salt of phosphorus oxoacid or weakly alkaline aqueous solution to be suitably controlled of the atomic ratio of titanium and phosphorus in the gel, and thereafter with optional pulverizing may be used as pigment, filler etc.

Thus in accordance with the invention the so prepared gel of titanium salt of phosphorus oxoacid substantially free of metallic impurities may be converted to titanium hydroxide by treating the wet or dry gel with aqueous solution of a basic substance such as, for example, caustic soda or caustic potash which can react with the phosphorus oxoacid radical in the gel to form water-soluble salt, and thereafter the wet or dried hydroxide is used as the final product as it is or after optional drying and crushing to desired size. Or, the product may further be calcined at about 500° C. or higher, preferably at 600° C. or higher, to be converted into titanium dioxide as aforesaid, which may also be pulverized before serving as final product.

Again in the invention metal or metals which can improve chalking resistance of pigment such as aluminium, tin, zinc, calcium, zirconium, etc. may be added in the form of aqueous solution of salt at the suitable stage of the subject process, for example to the product after the extraction, or after its drying or calcination, and thereafter neutralized so that the hydroxide of such metal should be deposited on the product, followed optionally by further drying and/or calcination to provide pigment of still improved chalking resistance. Or, carbon may be added to the starting solution of the subject process or to the sol temporarily formed, to produce gel of titanium salt of phosphorus oxoacid or titanium hydroxide in which carbon is present, the gel being further dephosphorized with an alkali treatment in the former case, and thereafter the product can be contacted with chlorine gas to produce refined titanium tetrachloride easily and smoothly.

Again the said titanium hydroxide prepared in accordance with the invention may be dissolved in hydrochloric acid or sulfuric acid and hydrolyzed under heating in the manner known per se to produce pure white titanium oxide. Such titanium oxides show excellent whiteness because they are substantially free from metallic impurities, and the hydrochloric acid or sulfuric acid used in the above procedures can be used repeatedly because they are little contaminated with metallic impurities.

Preparation of titanium ortho-phosphate by adding ortho-phosphoric acid or its water-soluble salt to sulfuric acid solution of titanium is known (e.g. B.P. 261,051). And, titanium ortho-phosphate is known to supply excellent white pigment, but it has not yet been commercialized.

Aqueous acid solution of titanium compound (e.g. solutions of sulfuric acid, hydrochloric acid, etc.) as mixed with phosphoric acid or its water-soluble salt very easily gels into jelly, flock or soft sand state which clogs the pores in filter paper or cloth, and therefore is heretofore regarded as hardly filterable. Therefore, although the excellence of titanium phosphate as pigment is known, its production on industrial scale has been regarded as practically impossible.

However, according to our researches, it was found that, (1) in mixing inorganic or organic acid solution of titanium compound containing metallic impurities (phosphorus oxoacid being excluded from inorganic acid, titanium salt itself or amorphous oxidation product of titanium with phosphorous oxoacid or a derivative thereof which can release phosphorus oxoacid radical under the reaction conditions, in the presence of water, if the conditions at the time of mixing are suitably selected, the resultant liquid mixture first takes the form of sol of relatively low viscosity for certain period and thereafter gels into jellied state, and that, therefore, utilizing its property to gel into jellied state, it is extremely easy to mould the same to granular gel. We also discovered (2) not only that, the gel composed mainly of titanium salt of phosphorus oxoacid in the form as obtained from the said liquid mixture (reaction liquid) is substantially impossible of handling, it being of course impossible to remove therefrom the metallic impurities, but when it is metallic impurities therefrom can be done with ease and converted into granular gel as aforesaid, removal of perfection by conventional extraction means such as water-washing, acid and alkali treatments, etc. Whereupon the present invention is completed.

Thus the titanium salt of phosphorus oxoacid, titanium hydroxide or titanium oxide prepared in accordance with the present invention possess high reflectivity and excellent whiteness either wet or dry, regardless of the type or amount of the phosphorus oxoacid employed.

Also in accordance with the invention it is possible to selectively remove undesirable metallic components (metallic impurities) only, while leaving such metallic components of which presence in the product is permissible depending on the intended use of the product titanium compound.

Hereinafter the invention will be explained with reference to working examples, it being understood that they are solely for assisting the understanding of the invention and in no sense limitative of the scope of the invention.

Example 1

In this example, preparation of substantially refined gel of titanium phosphate from iron sand slag is explained.

(A) Preparation of sulfuric acid solution of titanium salt.—Finely divided iron sand slag 1 kg., conc. sulfuric acid 1000 ml. and water 2000 ml. were mixed and heated to boiling, the boiling being continued for about an hour. After cooling, the system was diluted with minor amount of water and filtered to be removed of silicic acid component, the gypsum formed and unreacted material. Thus recovered titanium salt solution had a specific gravity of 1.40, of which composition being as follows:

|  | g./100 ml. (6.1%) |
|---|---|
| $TiO_2$ | 8.55 |
| $Ti_2O_3$ | 0.148 |
| $Fe_2O_3$ | 1.49 |
| $Al_2O_3$ | 3.23 |
| MgO | 1.39 |
| $V_2O_5$ | 0.0454 |
| $Cr_2O_3$ | 0.00215 |
| Mn | 0.338 |
| Free sulfuric acid | 1.53 |

The amount of free acid was determined in the following manner, the same method being applied as to those appearing in the specification hereinafter.

The sample 1–2 ml. was taken into an Erlenmeyer flask of 100 ml. capacity, diluted with water, and to which a few drops of Methyl Orange was added as the indicator. Titration was performed with 1 N NaOH standard reagent. The point at which light orange color was observed was made the terminal point and the amount of free acid was calculated by the formula below.

$$\text{Amount of free acid (F.A.) g/100 ml.} = \frac{F \times A \times 4.90}{S}$$

F: 1 N NaOH standard reagent titer
A: consumption of the reagent (number ml.)
S: amount of sample (ml.)

(B) Formation of titanium phosphate sol, and formation of wet, granular gel from the sol.—To 1000 ml. of the titanium salt solution prepared as in the above, JIS 1st-grade ortho-phosphoric acid (specific gravity 1.600, $H_3PO_4$ 85.0%) 50 ml. was added with agitation at room temperature to form a homogeneous sol mixture.

This sol mixture was immediately poured into a 20 cm. square aluminium plate as a film of 3 mm. thickness, and thereafter the sol was placed in a drying oven of 115° C. and heated for about 15 minutes. Thus flaky wet gel of 2 mm. thickness composed mainly of titanium phosphate was obtained.

(C) Extraction of metallic impurities from the flaky, wet gel of titanium phosphate.—A glass cylinder of 70 mm. inner diameter and 400 mm. length provided with a perforated plate and effluent pipe at the bottom was filled with about 800 ml. of aqueous sulfuric acid of pH 0.5, and into that extracting liquid about 600 g. of the flaky, wet gel of 2 mm. thickness as prepared in the above was quietly poured. The system was let stand for 24 hours, and thereafter from the top of the cylinder aqueous sulfuric acid of pH 0.5 for washing purpose which was heated to about 60–70° C. was dropped at the rate of 3.5 ml. per minute, while the equal amount of aqueous sulfuric acid was discharged from the effluent pipe at the bottom. The extraction and removal of the metallic impurities was thus continued until dropping of 1200 ml. of the aqueous sulfuric acid was completed, at which impurities ions became no more detectable in the exhaust efflux. Then in order to further remove the remaining trace of vanadium component, a similar treatment was prepared with 95° C. aqueous sulfuric acid of 30 g./100 ml. concentration. Upon following water-washing of the flaky wet gel in the cylinder, wet gel of titanium phosphate substantially free of impurities was obtained with such high yield as 99.0% (per $TiO_2$ in the starting titanium salt solution).

(D) Result.—Thus obtained wet gel of titanium phosphate had a mol ratio $TiO_2:P_2O_5$ of 3.7:1. The impurities contents of the gel of this example after calcination was determined by analysis with an emission spectrophotometer, and its whiteness was expressed by reflection measurement using a spectorphotometer in accordance with powder method, with the results as shown below. As control, results of similar measurements of commercial rutile type titanium oxide were also shown.

| | Titanium phosphate of this Example | Commercial titanium oxide |
|---|---|---|
| Impurities contents:[1] | | |
| V | — | + |
| Fe | — | ++ |
| Al | — | + |
| Pb | — | + |
| Reflectivity,[2] percent (wavelength mμ): | | |
| 350 | 50.5 | 6.3 |
| 400 | 100.5 | 36.3 |
| 500 | 100.5 | 95.0 |
| 600 | 100.5 | 95.0 |

[1] The sign (—) indicates that the substance is substantially not detectable by emission spectrophotometry; the sign (±) indicates that trace amount of the substance is detectable by the analysis; the sign (+) indicates that the substance is in appreciably detectable amount by the analysis; and the sign (++) indicates a particularly large amount of the substance is detected.

[2] The reflectivity is expressed by index number with that of $Al_2O_3$ plate being set as 100.

For confirming the substantial absence of metallic impurities in the titanium phosphate of the present example, the attached drawings should be referred to, in which (A) is the emission spectrum of the titanium phosphate of this example and (B) is the emission spectrum of commercial rutile-type titanium oxide. From the drawings it can be understood that the titanium phosphate of the present example is substantially completely free from metallic impurities such as V, Fe, Al, Pb, etc. as compared with the commercial rutile-type titanium oxide.

Again it is apparent from the above measured results that the titanium phosphate of this example has superior reflectivities at each wave length, particularly at ultraviolet portion, to those of the commercial titanium oxide.

Example 2

In this example preparation of substantially refined titanium phosphate by extraction of gel granulated from jellied gel formed from liquid mixture composed mainly of titanium phosphate is explained.

(A) Preparation of sulfuric acid solution of titanium salt.—A titanium sulfate solution (specific gravity 1.40) prepared in the manner described in A of Example 1 was employed.

(B) Formation of wet gel of titanium phosphate and granulation.—To 1000 ml. of the above titanium sulfate solution, JIS 1st grade ortho-phosphoric acid (specific gravity 1.690, $H_3PO_4$ 85.0%) 50 ml. was added with agitation at room temperature to form a liquid mixture of which viscosity increasing with time lapse. When the mixture was let stand for an hour at room temperature, violet-black jelly of wet gel composed mainly of titanium phosphate so hardened that it felt hard upon finger pushing was obtained. This jelly was shaped into a columnar form of 1.5 mm. diameter by extrusion, followed by air-drying for about 30 minutes.

(C) Extraction and removal of metallic impurities from the columnar wet gel of titanium phosphate.—Employing the same extraction apparatus as used in Example 1, extraction and removal of metallic impurities from the columnar wet gel composed mainly of titanium phosphate was practiced in the same manner as described in C of Example 1, using as the extraction solvent first aqueous sulfuric acid of pH 0.5 and than 95° C. aqueous sulfuric acid of 30 g./100 ml. concentration. Thereafter the gel was washed with water in the extraction column, to produce wet gel of titanium phosphate substantially free of metallic impurities with such high yield as 99.0% as to titanium component.

(D) Result.—Thus obtained wet gel of titanium phosphate had a mol ratio $TiO_2:P_2O_5$ of 3.66:1. The impurities content and whiteness of the calcined product of the gel obtained in this example are shown below as the results of emission spectrophotometric analysis and reflectivity measurements in accordance with powder method.

| Impurities contents: | Titanium phosphate of this example |
|---|---|
| V | — |
| Fe | — |
| Al | — |
| Pb | — |
| Reflectivity (percent) (wavelength mμ): | |
| 350 | 50.5 |
| 400 | 100.5 |
| 500 | 100.5 |
| 600 | 100.5 |

From the above measured results it is abundantly clear that the titanium phosphate obtained in this example is substantially completely free of impurities and that its reflectivities at varied wave lengths, particularly at ultraviolet portion, are excellent as compared with commercial titanium oxide.

Example 3

In this example, preparation of substantially refined titanium phosphate gel from titanium sulfate solution by other means is explained.

(A) Preparation of sulfuric acid solution of titanium salt.—Iron sand slag powder 1 kg., conc. sulfuric acid 1 liter and water 2 liters were mixed and heated to boiling. The boiling was continued for about an hour, and then the system was cooled and diluted with a large quantity of water, followed by filtration to be removed of silicic acid component, the gypsum formed and unreacted material. Thus obtained titanium salt solution had a composition as follows:

| | G./100 ml. (3.5%) |
|---|---|
| $TiO_2$ | 3.97 |
| $Ti_2O_3$ | 0.15 |
| $Fe_2O_3$ | 0.73 |
| $Al_2O_3$ | 1.53 |
| MgO | 0.67 |
| $V_2O_3$ | 0.0220 |
| $Cr_2O_3$ | 0.0010 |
| Mn | 0.158 |
| Free sulfuric acid | 1.10 |

Then the free sulfuric acid concentration in this recovered titanium sulfate solution was adjusted to 12 g./100 ml. with conc. sulfuric acid.

(B) Formation of titanium phosphate slurry and shaping of dry granular gel from the slurry.—To 1000 ml. of so prepared titanium sulfate solution, JIS 1st grade ortho-phosphoric acid (specific gravity 1.690, $H_3PO_4$ 85.0%) 25 ml. was added with agitation at room temperature, whereupon a slurry-state mixture composed mainly of titanium phosphate was formed.

This slurry-state mixture was poured onto an aluminium mould to form a sheet of 5 mm. thickness, and thereafter heated in a drying oven at 150° C. for 15 minutes. Thus flaky, incompletely dried gel of 3 mm. thickness composed mainly of titanium phosphate was obtained.

(C) Extraction and removal of metallic impurities from the flaky, incompletely dried gel of titanium phosphate.— Employing the extraction column used in C of Example 1, metallic impurities were extracted and removed from the flaky wet gel composed mainly of titanium phosphate in the manner as described in C of Example 1 using as the extraction solvent aqueous sulfuric acid of pH 0.5 and then 95° C. aqueous sulfuric acid of g./100 ml. Thereafter the flaky wet gel was washed with water in said cylinder, to produce incompletely dried gel of titanium phosphate which was substantially free from impurities with such high yield of 98.7% to the titanium component in the starting titanium salt solution.

(D) Result.—Thus obtained incompletely dried gel of titanium phosphate had a mol ratio $TiO_2:P_2O_5$ of 3.7:1.

The impurities contents and whiteness of the calcined product of the gel obtained in this example are shown below as the results of emission spectrophotometric analysis and reflectivity measurements in accordance with powder regulations.

| Impurities contents: | Titanium phosphate of this example |
|---|---|
| V | — |
| Fe | — |
| Al | — |
| Pb | — |

Reflectivity (percent) (wavelength m$\mu$):

| | |
|---|---|
| 350 | 49.0 |
| 400 | 102.0 |
| 500 | 102.5 |
| 600 | 102.5 |

From the above results it is clear that the titanium phosphate obtained in this example is substantially completely free of impurities and that its reflectivities at varied wavelengths, particularly at ultraviolet portion, are excellent as compared with commercial titanium oxide.

Example 4

In this example, preparation of substantially refined titanium phosphate gel from ilmenite ore is explained.

(A) Preparation of sulfuric acid solution of titanium salt from ilmenite ore.—Ilmenite ore was thoroughly crushed, and 1 kg. of the same which passed through 300 mesh sieve was used as the starting material, which was mixed with 500 ml. of water with agitation to form a slurry. To the slurry 1.2 kg. of conc. sulfuric acid was added and reacted by heating at the highest temperature of 140° C. for 2 hours. After the reaction while the system retained the porridge-like flowability, water was added thereto to make the total amount 2 liter, and thereby the titanium component was extracted under agitation. The unreacted residue was separated by filtration, and the titanium salt solution was recovered with the recovery ratio of about 90%.

The solution was further cooled so that iron component therein should be removed as $FeSO_4 \cdot 7H_2O$ crystal.

Thus obtained sulfuric acid solution of titanium salt had the following composition.

| | G./100 ml. |
|---|---|
| $TiO_2$ | 25.6 |
| $Fe_2O_3$ | 16.2 |
| $Al_2O_3$ | 2.02 |
| MgO | 1.80 |
| $V_2O_5$ | 0.040 |
| $Cr_2O_3$ | 0.0022 |
| Mn | 0.18 |
| Free sulfuric acid | 18.4 |

(B) Preparation of wet gel of titanium phosphate and granulation.—To 1000 ml. of the so prepared titanium salt solution from ilmenite ore, JIS 1st grade ortho-phosphoric acid (specific gravity 1.690 $H_3PO_4$ 85.0%) 150 ml. was added with agitation at room temperature to form a liquid mixture which, when let stand for 30 minutes at about 60° C., formed a well-coagulated jellied mass of wet gel composed mainly of titanium phosphate. This jelly was shaped into a columnar form of about 1.5 mm. diameter by extrusion, followed by about 30 minutes' air-drying.

(C) Extraction and removal of metallic impurities from the columnar wet gel of titanium phosphate.—In the same manner as described in C of Example 1, metallic impurities were extracted and removed from the columnar wet gel composed mainly of titanium phosphate. Then the columnar wet gel was washed with water in the extraction column to produce titanium phosphate gel which was substantially free of the metallic impurities with such high yield as 98.5% as to the titanium component.

(D) Result.—Thus obtained titanium phosphate gel had a mol ratio $TiO_2:P_2O_5$ of 3.7:1. Again impurities content and whiteness of the titanium phosphate obtained by calcining the above gel product are shown below as the results of the analysis and measurements similar to those of Example 1.

| Impurities contents: | Titanium phosphate of this example |
|---|---|
| V | — |
| Fe | — |
| Al | — |
| Pb | — |

Reflectivity (percent) (wavelength m$\mu$):

| | |
|---|---|
| 350 | 57.5 |
| 400 | 101.2 |
| 500 | 102.5 |
| 600 | 102.5 |

From the above results it is clear that the titanium phosphate obtained in this example is substantially completely free of impurities and that its reflectivities at varied wavelengths, particularly at ultraviolet portion, are excellent as compared with commercial titanium oxide.

Example 5

In this example, preparation of substantially refined titanium phosphate gel from amorphous titanium hydroxide containing impurities is explained.

(A) Preparation of impurities-containing titanium hydroxide.—To 500 ml. of the titanium sulfate solution containing 1.53 g./100 ml. of free acid as obtained in Example 1, 35 g. of ammonium bicarbonate powder was slowly added with agitation, whereupon the entire system was gelled. Remaining free liquid in the so formed gel was removed by vacuum filter, the remaining titanium hydroxide having a pH of 3.2 and a titanium component concentration (as $TiO_2$) of about 41.5%.

(B) Formation of wet gel of titanium phosphate and granulation.—To 600 g. of the impurities-containing titanium hydroxide prepared as in the above, JIS 1st-grade ortho-phosphoric acid (specific gravity 1.690, $H_3PO_4$ 85.0%) 400 ml. was gradually added with agitation at an elevated temperature of about 90° C. The resultant initially slurry-state mixture then formed a homogeneous fluid, changed gradually into viscous gel, to finally form a purple-black jellied mass of yet gel composed mainly of titanium phosphate, coagulated to the degree as felt hard on finger pushing. This jellied mass was extruded into a columnar form of 1.5 mm. diameter, followed by about 30 minutes air-drying at room temperature.

(C) Extraction of metallic impurities from the commercial wet gel of titanium phosphate.—Treating the so-obtained wet gel in the similar manner as described in C of Example 1, titanium phosphate gel which was substantially free from metallic impurities was obtained with such high yield as 99.0% as to the titanium component.

(D) Result.—The obtained wet gel of titanium phosphate had a mol ratio $TiO_2:P_2O_5$ of 1.2:1. Again the impurities content and whiteness of the titanium phosphate obtained by calcination of the same gel were shown below, as the results of similar analysis and measurements as described in Example 1.

| Impurities contents: | Titanium phosphate of this example |
|---|---|
| V | — |
| Fe | — |
| Al | — |
| Pb | — |

Reflectivity (percent) (wavelength m$\mu$):

| | |
|---|---|
| 350 | 64.5 |
| 400 | 100.5 |
| 500 | 101.5 |
| 600 | 101.5 |

From the above results it is clear that the titanium phosphate obtained in this example is substantially completely free of impurities and that it reflectivities at varied wavelengths, particularly at ultraviolet portion, are excellent as compared with commercial titanium oxide.

Example 6

In this example preparation of substantially refined titanium phosphate gel using amorphous hydrous titanium oxide prepared by heated hydrolysis from acidic titanium salt solution containing impurities is explained.

(A) Preparaton of impurities-containing amorphous, hydrous titanium oxide.—The sulfuric acid solution of titanium salt containing titanium component (as $TiO_2$) of 25.6 g./100 ml. prepared from ilmenite ore in Example 4 2000 ml. was heated to boiling and hydrolyzed in accordance with the accepted practice, yielding hydrolysate of the titanium component consisted mainly of hydrous titanium oxide. Thereafter the hydrolysate was separated from the liquor. This separated hydrate was proven amorphous by X-ray diffractiometry. To wit, thus about 530 g. of amorphous, hydrous titanium oxide with metallic impurities as deposited thereon was obtained. This amorphous hydrate contained 70.5% of titanium component (as $TiO_2$).

(B) Formation of wet gel of titanium phosphate and moulding.—To 100 g. of thus obtained hydrous titanium oxide containing metallic impurities, 110 ml. of JIS 1st-grade ortho-phosphoric acid was gradually added with agitation at an elevated temperature of about 90° C. Intionally the hydrous titanium oxide was dispersed in the phosphoric acid and then formed a homogeneous fluid with the latter, which changed gradually into viscous gel finally to become a jellied mass of wet gel composed mainly of titanium phosphate having a hardness as can be felt hard upon finger pushing. This jellied mass was extruded into a columnar form of about 1.5 mm. diameter, followed by about 30 minutes air-drying at room temperature.

(C) Extraction of metallic impurities from the columnar wet gel of titanium phosphate.—The metallic impurities in the so obtained wet gel were extracted and removed by decantation method using as the extraction solvent aqueous sulfuric acid of 10 g./100 ml. concentration at about 50° C. Thus wet gel of titanium phosphate which was substantially free from impurities was obtained with such high yield as 99.5% (as to the titanium component).

(D) Results.—Thus obtained wet gel of titanium phosphate had a mol ratio $TiO_2:P_2O_5$ of 1.90:1. Again the impurities contents of the titanium phosphate obtained by calcination of the same gel was determined by emission spectrophotometric analysis, and its whiteness was measured by means of reflectivity in accordance with powder method using a spectrophotometer. The results are shown below.

Impurities content:
    Titanium phosphate of this example
- V ----
- Fe ----
- Al ----
- Pb ----

Reflectivity (percent) (wave length m$\mu$)
- 350 ---- 62.5
- 400 ---- 101.0
- 500 ---- 101.0
- 600 ---- 101.0

From the above results it is clear that the titanium phosphate obtained in this example is substantially completely free of impurities and that its reflectivities at varied wave lengths, particularly at ultraviolet portion, are excellent as compared with commercial titanium oxide.

Example 7

In this example preparation of titanium phosphate gel from various mineral acid and organic acid solutions of titanium salt is explained.

Each 1 kg. of iron sand slag powder was extracted with varieties of acids under the conditions indicated below, and the extraction liquids were filtered to be removed of silicic acid component, unreacted material and side product. Thus recovered titanium salt solutions had compositions as shown in Table 1.

Upon addition of 85% ortho-phosphoric acid to each 100 ml. of the titanium salt solutions at room temperature, for a certain period flowable, stable and homogeneous sol mixtures of titanium phosphate were obtained. Those sol mixtures were gelled in the same manner as described in Example 1 and shaped into granules, followed by extraction and removal therefrom of metallic impurities in the manner described in C of Example 1. Thus substantially refined flaky wet gel of titanium phosphate was obtained.

The results are also shown in Table I. The extraction conditions of titanium salt solutions from iron sand slag were as follows:

(1) Sulfuric acid of specific gravity 1.70, 100 ml.; highest temperature, 60° C. for about 60 minutes. After the reaction the system was diluted with a minor amount of water.

(2) 3 N-hydrochloric acid, 5000 ml.; highest temperature 50° C. for about 60 minutes.

(3) 3 N-nitric acid, 4000 ml.; highest temperature, 80° C. for about 30 minutes.

(4) Iron sand slag powder, 100 g., was suspended in 2000 ml. of water, into which sulfurous acid gas ($SO_2$) being introduced at room temperature for 3 hours.

(5) Mixed acid consisting of 60 g./100 ml. sulfuric

TABLE 1

| Type of acid | Main composition of extracted titanium salt solution (g./100 ml.) | | | | | | Amount of orthophosphoric acid added, to 100 ml. of titanium salt solution, ml. | Sol[1] duration, min. | Wet gel product | | | | | | | Reflectivity of calcined product, percent wavelength (m$\mu$) | | | | |
|---|---|---|---|---|---|---|---|---|---|---|---|---|---|---|---|---|---|---|---|---|
| | $TiO_2$ | $Fe_2O_3$ | $Al_2O_3$ | $V_2O_5$ | F.A. | | | Yield, percent | Composition[2] ($TiO_2:P_2O_5$) | Impurities | | | | | 350 | 400 | 500 | 600 |
| | | | | | | | | | | V | Fe | Al | Pb | | | | | |
| Sulfuric acid ($H_2SO_4$) | 8.70 | 1.49 | 3.23 | 0.045 | 5.5 | 5.0 | 12 | 99.0 | 3.7:1 | | | | | 50.5 | 100.5 | 100.5 | 100.5 |
| Hydrochloric acid (HCl) | 4.03 | 0.84 | 1.38 | 0.021 | 4.2 | 4.0 | 14 | 98.7 | 3.6:1 | | | | | 52.5 | 100.5 | 100.5 | 100.5 |
| Nitric acid ($HNO_3$) | 5.15 | 0.96 | 1.97 | 0.029 | 3.0 | 5.0 | 20 | 98.8 | 3.6:1 | | | | | 64.0 | 101.0 | 101.0 | 101.0 |
| Sulfurous acid ($H_2SO_3$) | 0.18 | 0.06 | 0.15 | 0.009 | 17.0 | 1.0 | 5 | 98.5 | 3.0:1 | | | | | 65.0 | 100.5 | 100.5 | 100.5 |
| Mixed acid ($H_2SO_4$ plus $HNO_3$) | 4.60 | 0.91 | 1.73 | 0.050 | 4.7 | 5.0 | 13 | 98.5 | 3.4:1 | | | | | 57.5 | 100.5 | 100.5 | 100.5 |
| Oxalic acid (($COOH)_2$) | 6.30 | 0.38 | 2.25 | 0.038 | 11.5 | 5.0 | 17 | 99.0 | 3.7:1 | | | | | 47.5 | 100.0 | 100.5 | 100.5 |
| Methane-sulfonic acid ($CH_3SO_3H$) | 2.57 | 0.47 | 0.98 | 0.015 | 12.7 | 3.0 | 10 | 98.7 | 3.6:1 | | | | | 50.0 | 100.5 | 100.5 | 100.5 |

[1] Sol duration is expressed by the time lapsed before the liquid mixture lost its flowability.
[2] Composition of the wet gel product is expressed by mol ratio of $TiO_2:P_2O_5$.

acid, 2000 ml.; 3 N-nitric acid, 200 ml.; highest temperature 60° C. for about 40 minutes.

(6) 60% oxalic acid (slurry), 5000 ml.; highest temperature 90° C. for about 60 minutes.

(7) 25% methanesulfonic acid, 4300 ml.; highest temperature 90° C. for about 3 minutes.

From the above Table 1, it can be understood that regardless of the type of mineral or organic acid employed, the product titanium phosphate gel is substantially completely removed of the impurities such as V, Fe, Al and Pb, and furthermore that the calcined products in all cases show excellent whiteness.

Example 8

In this example, preparation of titanium phosphate gel from titanium salt solutions of varied $TiO_2$ concentrations is explained.

(A) Preparation of varied titanium salt solutions.—
As the titanium materials,
(a) titanium sulfate solution prepared from iron sand slag in Example 1,
(b) titanium sulfate solution prepared from ilmenite ore in Example 4,
(c) titanium-containing sulfuric acid exhaust side-produced in titanium dioxide preparation by sulfate process as exhaust acid, and
(d) titanium tetrachloride of reagent JIS 1st grade (containing about 0.1% of vanadium (V) as metallic impurity)

were selected, from which titanium salt solutions of $TiO_2$ concentrations as indicated in Table 2 were prepared. In all cases except (d) the amount of free acid was adjusted to about 10.0 g./100 ml. using lime or sulfuric acid.

(B) Formation of liquid mixtures composed mainly of titanium phopshate and moulding.—As the phosphoric acid source, JIS 1st grade ortho-phosphoric acid (specific gravity 1.690, $H_3PO_4$ 85.0%) was used, which was mixed with the titanium salt solutions of varied $TiO_2$ concentrations at such quantitative ratios as to make the mol ratio of $TiO_2:P_2O_5$ in the mixture about 3:1. Whereupon depending on the $TiO_2$ concentration the liquid mixtures formed slurry-state gel, maintained sol state, or instantaneously converted into jellied mass of gel. In case the mixtures were obtained thus in slurry form or sol state, they can be easily coagulated as a whole by standing or heating in heated atmosphere. The jellied masses herein obtained were shaped into columns of 1.5 mm. diameter in the similar manner as described in B of Example 2. In this case, in order to obtain integrated jellied mass of shapeable hardness by standing without increasing $TiO_2$ concentration of the mixture by such means as heating, the $TiO_2$ concentration in the liquid mixture must be at least 40 g./100 ml.

(C) Extraction and removal of metallic impurities from the wet columnar gels of titanium phosphate of varied $TiO_2$ concentrations.—From thus obtained wet columnar gels composed mainly of titanium phosphate substantially refined titanium phosphate gels were obtained by extracting therefrom the metallic impurities in the manner described in C of Example I using as the extracting solvent aqueous sulfuric acid of 5 g./100 ml. and 30 g./100 ml. concentrations, and thereafter washing the gels.

(D) Results.—From the above titanium salt solutions of varied $TiO_2$ concentrations, substantially refined titanium phosphates were prepared under the reaction conditions indicated in Table 2, with the results also indicated in the same table. Also the impurities contents of the product titanium phosphate gels and reflectivities of the calcined products thereof at each wave length are concurrently shown.

As is apparent from Table 2, the products of the invention are substantially completely free of metallic impurities and furthermore exhibit excellent reflectivity particularly at ultraviolet portion of light regardless the $TiO_2$ concentration in the starting titanium salt solution or preparation procedure of the said solution.

TABLE 2

| $TiO_2$ concentration of titanium salt solution (g./100 ml.) | Starting material of titanium salt solution | Amount of ortho-phosphoric acid (ml./100 ml. of titanium salt solution) | State of gelling of liquid mixture | Sol duration before gelling (min./° C.) | Product wet gel ||||||||
|---|---|---|---|---|---|---|---|---|---|---|---|---|
| | | | | | Yield, percent | Impurities contents |||| Reflectivity of calcined product (wavelength mμ) ||||
| | | | | | | V | Fe | Al | Pb | 350 | 400 | 500 | 600 |
| 0.8 | (c) Titanium containing sulfuric acid exhaust. | 0.6 | Slurry | 20/20 | 98.3 | | | | | 47.3 | 100.0 | 100.5 | 100.5 |
| 1.0 | (a) Iron sand slag | 0.6 | do | 20/20 | 98.4 | | | | | 52.5 | 91.5 | 95.6 | 96.0 |
| 4.35 | do | 2.5 | Soft jelly | 18/20 | 98.4 | | | | | 49.0 | 102.0 | 102.5 | 102.5 |
| 8.70 | do | 5.0 | Jelly | 25/10 | 99.0 | | | | | 49.5 | 101.5 | 102.0 | 102.0 |
| 12.8 | (b) Ilmenite ore | 7.5 | do | 30/0 | 99.0 | | | | | 50.0 | 101.0 | 102.0 | 102.0 |
| 25.6 | do | 15.0 | do | 30/0 | 99.0 | | | | | 50.5 | 101.2 | 102.5 | 102.5 |
| 56.6 | (d) Titanium tetrachloride | 30.0 | do | 30/0 | 98.5 | | | | | 53.5 | 101.5 | 102.0 | 102.0 |
| 116.6 | do | 60.0 | Block | 30/0 | 98.8 | | | | | 59.5 | 102.5 | 103.0 | 103.0 |
| $TiCl_4$ itself | do | 40.0 | do | (¹) | 82.5 | | | | | 64.5 | 103.0 | 103.0 | 103.5 |

¹ Instantaneous/25.

Example 9

In this example, preparation of titanium phosphate from amorphous oxides of titanium obtained by heating at varied temperatures is explained.

As the materials, (a) titanium hydroxide prepared by neutralization of Example 5 and (b) hydrous titanium oxide prepared by heating hydrolysis in Example 6 were used, which were each heated to 100° C., 300° C., 500° C. and 650° C. for an hour. Thus obtained oxidation products were amorphous in terms of X-ray diffractiometry, which were then added with JIS 1st grade ortho-phosphoric acid ($H_3PO_4$ 85.0%) at such quantitative ratios as to make the mol ratio of $TiO_2:P_2O_5$ in the mixtures 1:1, at 90° C. and intimately mixed therewith, followed by 2 hours' standing for reaction to be completed. Thus wet gels composed mainly of titanium phosphate were obtained.

Those wet gels were further thinly placed in a vat and dried in a drying oven to be converted into flaky or blocky granular wet gel composed mainly of titanium phosphate. By extracting from the wet gels the metallic impurities in the manner described in C of Example 1 and thereafter washing the same, substantially refined titanium phosphate gels were obtained.

As to the titanium phosphate gels obtained by calcining the above at 800° C., the impurities contents and whiteness thereof were analyzed and measured. The results are shown in Table 3 below.

scribed in C of Example 1. Washing the remaining gels, substantially refined gels of titanium salt of phosphorus oxacid were obtained.

As the phosphorus ore that produced in Florida, U.S.A., was used, which was thoroughly crushed, removed of foreign matters and wet-ground into superfinely divided form. The main components thereof are:

TABLE 3

| Preparation of starting hydrous titanium oxide | Neutralization method (a) (cf. Example 5) | | | | Heating hydrolysis method (b) (cf. Example 6) | | | |
| --- | --- | --- | --- | --- | --- | --- | --- | --- |
| Treating temp. of starting hydrous titanium oxide (° C.) | 100 | 300 | 500 | 650 | 100 | 300 | 500 | 650 |
| TiO$_2$ concentration in the treated titanium compound, percent | 46.8 | 52.3 | 52.8 | 63.0 | 75.8 | 97.5 | 98.2 | 98.5 |
| X-ray diffraction image | (¹) | (¹) | (¹) | (¹) | (¹) | (¹) | (¹) | (¹) |
| Wet gel product: | | | | | | | | |
| Yield, percent | 99.2 | 99.0 | 99.3 | 99.0 | 99.0 | 99.5 | 99.2 | 99.0 |
| Composition (mol ratio TiO$_2$:P$_2$O$_5$) | 1.9:1 | 1.9:1 | 2.0:1 | 2.2:1 | 1.9:1 | 2.0:1 | 2.2:1 | 2.3:1 |
| Impurities contents: | | | | | | | | |
| V | | | | | | | | |
| Fe | | | | | | | | |
| Al | | | | | | | | |
| Pb | | | | | | | | |
| Reflectivity of calcined product, percent (wavelength mμ): | | | | | | | | |
| 350 | 58.5 | 57.0 | 57.0 | 56.5 | 59.0 | 57.0 | 56.0 | 56.5 |
| 400 | 100.5 | 100.0 | 100.0 | 100.0 | 100.0 | 100.0 | 100.0 | 100.0 |
| 500 | 100.5 | 100.5 | 100.5 | 100.5 | 100.5 | 100.5 | 100.5 | 100.5 |
| 600 | 100.5 | 100.5 | 100.5 | 100.5 | 100.5 | 100.5 | 100.5 | 100.5 |

¹ Amorphous.

From the above results it can be understood that when treating temperature of the starting hydrous titanium oxide is varied, still so far as the resultant oxide of titanium is amorphous in terms of X-ray diffractometry, wet gel of titanium phosphate is obtainable, and furthermore that by shaping the same into granular form and extracting metallic impurities therefrom, substantially refined titanium phosphate of excellent whiteness can be obtained.

Example 10

In this example preparation of titanium salt of phosphorus oxoacid from phosphorus ore as well as various phosphorus oxoacids and derivatives thereof is explained.

To the titanium salt solution prepared in accordance with the method of Example 1, sulfuric acid was added to adjust the amount of free sulfuric acid 10.0g./100 ml. To the same solution, phosphorus ore, crude phosphoric acid solution, varied types of phosphorus oxoacids and derivatives thereof as indicated in Table 4 were added each at such a ratio as to provide about 1 mol P$_2$O$_5$ per 3 mols TiO$_2$ at room temperature, to form sol mixtures composed mainly of titanium salt of phosphorus oxoacid. Accordingly the mixtures were shaped into flaky wet gels composed mainly of the corresponding titanium salt of phosphorus oxoacid in the manner as described in B of Example 1. From the resultant granular wet gels, the metallic impurities were extracted in the manner de- P$_2$O$_5$, 35.6%; Fe$_2$O$_3$, 0.61%; Al$_2$O$_3$, 1.44%; CaO, 50.40%; MgO, 0.87%; F, 3.90%; and SiO$_2$, 4.50%.

Again when phosphorus ore and other phosphorus salt of oxoacid were used, equivalent amount to the phosphorus salt of oxoacid of sulfuric acid and added to the system in advance.

As the crude phosphoric acid solution, phosphoric acid solution prepared by sulfuric acid treatment of phosphorus ore produced in Kola, U.S.S.R., was used without refining, of which main components being as follows: P$_2$O$_5$, 34.9%; MgO, 0.13%; Fe$_2$O$_3$, 0.53%; Al$_2$O$_3$, 0.58%; and F, 0.27%.

In case the gel composed mainly of titanium salt of phosphorus oxoacid was prepared from phosphorus ore, calcium phosphate or crude phosphoric acid, the extraction therefrom of the metallic impurities was performed employing aqueous hydrochloric acid of pH 0.5 as the extracting solvent.

As to the products obtained by calcining the above-obtained substantially refined gels of titanium salt of phosphorus oxoacid at 800° C., their impurities contents were determined by analysis and also whiteness was measured, with the results as shown in Table 4.

From the results it can be understood that also when titanium salt of phosphorus oxoacid was prepared from varied types of phosphorus oxoacid and derivatives thereof, the impurities can be substantially completely removed, and the calcined products therefrom exhibit excellent whiteness.

TABLE 4

| Phosphorus oxy acid or derivative thereof | Amount added per 100 ml. of titanium salt solution | Sol duration (5° C. min.) | Wet gel product | | | | | | | |
| --- | --- | --- | --- | --- | --- | --- | --- | --- | --- | --- |
| | | | Composition (TiO$_2$:P$_2$O$_5$) | Impurities contents | | | | Reflectivity of calcined product, percent (wavelength mμ) | | |
| | | | | V | Fe | Al | Pb | 350 | 400 | 500 | 600 |
| Phosphorus ore | 12 g. slurried with water | 18 | 1.5:1 | | | | | 52.3 | 100.5 | 101.0 | 101.0 |
| Crude phosphoric acid solution | 12 g. | 15 | 3.5:1 | | | | | 54.5 | 100.5 | 101.0 | 101.0 |
| Ortho-phosphoric acid (H$_3$PO$_4$) | 85% (d=1.69) 5 ml. | 15 | 3.7:1 | | | | | 50.5 | 100.5 | 100.5 | 100.5 |
| Metaphosphoric acid (HPO$_3$) | 18.4 g. plus water 10 ml. (dissolved by heating). | 15 | 3.7:1 | | | | | 84.0 | 100.5 | 101.0 | 103.0 |
| Pyrophosphoric acid (H$_4$P$_2$O$_7$) | 7.80 g. plus water 10 ml. (dissolved by heating). | 15 | 3.7:1 | | | | | 60.0 | 100.5 | 101.0 | 101.5 |
| Sodium ortho-phosphate (Na$_2$HPO$_4$·12H$_2$O). | 28.6 g. plus water 20 ml. (dissolved by heating). | 17 | 4.0:1 | | | | | 42.0 | 98.0 | 100.0 | 100.0 |
| Sodium metaphosphate (NaPO$_3$) | 8.13 g. (added as powder) | 0 | 1.4:1 | | | | | 62.5 | 93.5 | 98.5 | 99.0 |
| Sodium pyrophosphate (Na$_4$P$_2$O$_7$) | 17.8 g. (added as powder) | 0 | 1.4:1 | | | | | 59.5 | 97.0 | 98.0 | 98.0 |
| Calcium ortho-phosphate (Ca$_3$(PO$_4$)$_2$) | 22.3 g. (added as powder) | 0 | 1.3:1 | | | | | 35.5 | 92.0 | 98.0 | 98.0 |
| Ammonium orthophosphate ((NH$_4$)$_2$HPO$_4$). | 10.5 g. (added as powder) | 0 | 1.3:1 | | | | | 50.0 | 99.5 | 100.5 | 100.5 |
| Sodium hexametaphosphate (NaPO$_3$)$_6$ | 8.13 g. plus water 20 ml. (dissolved by heating). | 15 | 3.5:1 | | | | | 54.5 | 102.0 | 102.5 | 102.5 |
| Sodium tripolyphosphate (Na$_5$P$_3$O$_{10}$) | 9.78 g. plus water 10 ml. | 15 | 3.5:1 | | | | | 61.0 | 103.0 | 103.0 | 103.0 |
| Sodium phosphite (Na$_2$HPO$_3$) | 17.2 g (added as powder) | 0 | 0.9:1 | | | | | 19.5 | 93.0 | 95.5 | 96.0 |
| Hypophosphorous acid (H$_3$PO$_2$) | 1.8 mol/l, 40 ml. | 0 | 0.8:1 | | | | | 22.0 | 92.5 | 100.0 | 100.0 |

¹ In this example, because the washing was performed in aqueous sulfuric acid, calcium sulfate remained in the titanium phosphate product. This is useful as a filler in paper making having better whiteness than that of commercial titanium oxide.

Example 11

In this example, significance of free acid concentration in the aqueous acid solution of titanium salt on preparation of titanium phosphate gel is explained.

To the sulfuric acid solution of titanium salt prepared from iron sand slag in accordance with the method of Example 1, sulfuric acid was added to form sulfuric acid solutions of titanium salt having free sulfuric acid concentrations of each 1.5, 3.0, 5.0, 10.0, 15.0, 20.0 and 25.0 g./100 ml.

To each 100 ml. of the above solutions JIS 1st grade phosphoric acid ($H_3PO_4$, 85.0%) 5 ml. was added at 5° C., and whereupon sol-state mixtures were obtained, which were converted to flaky wet gel under heating in the manner described in B of Example 1. Thus obtained wet gels composed mainly of titanium phosphate were treated in the manner described in C of Example 1, and flaky wet gels which were substantially free from impurities were obtained.

The results are shown in Table 5, from which it can be understood that the duration of sol-state before the mixture gels is prolonged with the increase in the amount of free sulfuric acid. In case the free sulfuric acid content was 1.5 and 3.0 g./100 ml., vanadium remained in the product titanium phosphate gel even after washing with acid, which can be extracted and removed by treating the gels with 30 g./100 ml. aqueous sulfuric acid. The test results of the titanium phosphate gels refined by such treatment are shown in Table 11, from which it can be understood that the products are substantially completely freed from the impurities similarly to the cases in which the amount of free acid is greater and furthermore that they also exhibit excellent reflectivity.

described in B of Example 1. From the resultant granular wet gels composed mainly of titanium phosphate, the impurities contained therein were extracted and removed in the similar manner as described in C of Example 1, and thus substantially refined flaky wet gels of titanium phosphate were obtained.

The results are shown in Table 6, from which it can be understood that when phosphoric acid component is added to the titanium salt solution at such quantities as will make the mol ratio of $TiO_2:P_2O_5$ in the resultant mixture 7:1–1:2, satisfactory titanium phosphate gel can be obtained, and furthermore that with the increase in the phosphoric acid quantity, duration of sol state is shortened. Again it can be seen that the impurities contents and whiteness of the resultant gel are not much affected by the mol ratio between phosphoric acid component and titanium component bonded.

TABLE 6

| | Amount of phosphoric acid, ml. | Temp. at the time of sol formation (°C.) | Sol duration, min. | Wet gel product | | | | | | | Reflectivity of calcined product, percent wavelength (mμ) | | | |
|---|---|---|---|---|---|---|---|---|---|---|---|---|---|---|
| | | | | Yield, percent | Composition ($TiO_2:P_2O_5$) | pH[1] | V | Fe | Al | Pb | 350 | 400 | 500 | 600 |
| 9:1 | 1.2 | 7 | ∞ | | | | | | | | | | | |
| 7:1 | 2.1 | 7 | 30 | 98.7 | 7.3:1 | 5.2 | | | | | 59.3 | 98.0 | 99.0 | 99.0 |
| 5:1 | 3.1 | 7 | 27 | 98.8 | 5.2:1 | 5.0 | | | | | 54.0 | 100.5 | 100.5 | 100.5 |
| 4:1 | 3.6 | 7 | 25 | 98.8 | 4.2:1 | 4.8 | | | | | 50.5 | 100.5 | 100.5 | 100.5 |
| 3:1 | 5.1 | 7 | 22 | 99.0 | 3.7:1 | 4.6 | | | | | 55.0 | 100.5 | 101.0 | 101.0 |
| 1:1 | 15.0 | 7 | 20 | 99.0 | | | | | | | 59.5 | 101.5 | 101.5 | 101.5 |

[1] pH was determined by taking 10 g. of the wet gel product into 50 ml. of distilled water and boiling the system at 100° C. for 30 minutes, and there after measuring its pH with glass electrode pH meter.

Example 13

In this example, the influence of temperature on preparation of the liquid mixture from phosphoric acid and titanium material is explained.

The sulfuric acid solution of titanium salt prepared in accordance with the method of Example 1 was maintained at varied temperatures as 0° C., 5° C., 10° C., room temperature (17° C.), 40° C., 60° C. and 80° C., and to 100 ml. each of the same 5 ml. of JIS 1st grade orthophosphoric acid ($H_3PO_4$ 85.0%) was added with agitation at the said temperatures. Sol-state mixtures were formed, which became more viscous when let stand and finally jellified.

The relationship between the duration of stable sol

TABLE 5

| | Duration of sol-state before gelling, min. | Color of gel after washing | Wet gel product | | | | | | | | |
|---|---|---|---|---|---|---|---|---|---|---|---|
| | | | Yield, percent | Impurities contents | | | | Reflectivity of calcined product, percent (wavelength mμ) | | | |
| | | | | V | Fe | Al | Pb | 350 | 400 | 500 | 600 |
| Free sulfuric acid (g./100 ml.): | | | | | | | | | | | |
| 1.5 | 13.0 | Light green | 98.8 | + | | | | 15.5 | 67.0 | 89.0 | 89.0 |
| 3.0 | 14.0 | do | 98.7 | + | | | | 16.5 | 69.0 | 91.0 | 91.0 |
| 5.0 | 14.5 | White | 98.8 | | | | | 51.0 | 100.8 | 101.0 | 101.0 |
| 10.0 | 16.5 | do | 99.0 | | | | | 50.5 | 100.5 | 100.5 | 100.5 |
| 15.0 | 18.5 | do | 98.7 | | | | | 53.0 | 101.0 | 101.0 | 101.0 |
| 20.0 | 20.0 | do | 98.8 | | | | | 52.5 | 101.2 | 101.5 | 101.5 |
| 25.0 | 30.0 | do | 98.5 | | | | | 53.0 | 102.0 | 102.0 | 102.0 |

Example 12

In this Example, preparation of wet gel of titanium phosphate from mixtures of varied $TiO_2:P_2O_5$ mol ratios is explained.

The amount of free sulfuric acid in the sulfuric acid solution of titanium salt prepared by the method of Example 1 was adjusted to 10 g./100 ml. To 100 ml. each of the solution, JIS 1st grade ortho-phosphoric acid was added in varied amounts as 2.1, 3.1, 3.6, 5.1 and 15.0 ml. at 7° C. to form sol mixtures before the mixtures gelled, they were heated and shaped into flakes in the smaller manner as (time required for the liquid to completely lose flowability) and temperature is shown in Table 7.

The sol mixtures were moulded in accordance with the method of B of Example 1, and the resultant flaky wet gels composed chiefly of titanium phosphate were removed of the metallic impurities by extraction and washed with water. Thus refined flaky wet gels of titanium phosphate were obtained, of which test results being shown also in Table 7.

From the same table, it can be understood that the duration of sol before gelling can be suitably controlled by varying the temperature.

TABLE 7

| Temp. at formation of sol mixture (° C.): | Sol duration before gelling (min., sec.) | Wet gel product Impurities contents | | | | Reflectivity of calcined product, percent wavelength (mμ) | | | |
|---|---|---|---|---|---|---|---|---|---|
| | | V | Fe | Al | Pb | 350 | 400 | 500 | 600 |
| 0 | 27 (min.) | | | | | 50.0 | 100.5 | 100.5 | 100.5 |
| 5 | 23 (min.) | | | | | 52.0 | 101.0 | 101.0 | 101.0 |
| 10 | 17 (min.) | | | | | 50.3 | 100.5 | 100.5 | 100.5 |
| 20 | 12 (min.) | | | | | 50.5 | 100.5 | 100.5 | 100.5 |
| 40 | 60 (sec.) | | | | | 50.2 | 101.0 | 101.5 | 101.5 |
| 60 | 10 (sec.) | | | | | 51.5 | 101.0 | 101.0 | 101.0 |
| 80 | 3 (sec.) | | | | | 62.5 | 102.0 | 102.0 | 102.0 |

Example 14

In this example, an embodiment in which the sol of liquid mixture obtained from phosphoric acid and titanium material is moulded spherical while its gelling is under progress is explained.

A sulfuric acid solution of titanium salt was prepared in accordance with the method of A of Example 1, and further its free sulfuric acid content was controlled to 10.0 g./100 ml.

To 1000 ml. of this solution (specific gravity 1.40), 50 ml. of JIS 1st grade ortho-phosphoric acid ($H_3PO_4$ 85.0%) was added with agitation at room temperature to form a sol-state mixture, which was extruded through a nozzle into trichlorobenzene contained in a granulation column from the bottom while the mixture still retained its flowability, under the conditions given below.

Thus extruded mixture became spherical in the liquid medium and was converted to gel by heating as the same slowly rose in the medium, and by the time it reached the liquid surface, formed spherical wet gel of 2 mm. diameter composed mainly of titanium phosphate.

Granulation column:
    Diameter _____ mm__ 30
    Height _____ mm__ 1500
Liquid medium:
    Trichlorobenzene:
        Specific gravity (25° C.) _____ 1.44
        Temperature, ° C. _____ 110
        Diameter of extruding nozzle ____mm__ 0.5
        Rate of extrusion _____ ml./min__ 53
        Staying time in the liquid ____seconds__ 8

Thus formed spherical gel composed chiefly of titanium phosphate 600 g. was subjected to the metallic impurities extraction step as described in C of Example 1, and washed with water. Thus refined spherical wet gel of titanium phosphate was obtained.

Substantially no impurities such as V, Fe, Al and Pb was detected in the spherical gel by emission spectrophotometric analysis, and the calcined product of the gel exhibit excellent whiteness as demonstrated by its reflectivities at varied wave lengths as shown below.

| Reflectivity (percent) (wave length mμ): | Titanium phosphate of this example |
|---|---|
| 350 | 47.8 |
| 400 | 100.0 |
| 500 | 100.5 |
| 600 | 101.0 |

Example 15

In this example, another embodiment in which the sol of liquid mixture obtained from phosphoric acid and titanium material was shaped spherical while it was being converted to wet gel is explained.

A sulfuric acid solution of titanium salt was prepared in the manner of A of Example 1, and it free sulfuric acid content was adjusted to 10.0 g./100 ml.

To 1000 ml. of the solution (specific gravity 1.40) 50 ml. of JIS 1st grade orthophosphoric acid ($H_3PO_4$ 85.0%) was added with agitation at room temperature to form a sol-state mixture, immediately diluted with water (to S.G. 1.20). And, while the mixture still retained flowability, it was extruded through a nozzle (0.5 mm. diameter) into a medium contained in a granulation column (30 mm. diameter) either from the bottom or top, under the conditions given in Table 8.

Thus extruded mixture became spherical and was converted to gel by heating, forming spherical wet gel composed chiefly of titanium phosphate.

Thus formed wet spherical gels 600 g. each was subjected to the metallic impurities extraction step as described in C of Example 1, and washed with water. Whereupon refined spherical wet gels of titanium phosphate were obtained.

These wet gels were substantially free from impurities such as V, Fe, Al and Pb according to the result of emission spectrophotometric analysis similarly to the products of Example 14, and also exhibited excellent whiteness.

TABLE 8

| Type of medium | Direction of sol extrusion | Temp. of medium (° C.) | Extrusion rate of sol (ml./min.) | Height of column (cm.) | Staying time of gel in medium (sec.) | Diameter of spherical wet gel produced (mm.) |
|---|---|---|---|---|---|---|
| Specific gravity of medium: | | | | | | |
| 0.810 ____ Kerosene | Top——→Bottom | 110 | 60 | 150 | 4 | 5-6 |
| 0.930 ____ Light oil (gas oil) | do | 110 | 60 | 150 | 6 | 4-3 |
| 1.030 ____ Kerosene, 50%; Dichlorobenzene, 50%; (Specific gravity 1.297, 20° C.). | do | 110 | 60 | 150 | 6 | 4-5 |
| 1.250 ____ Trichlorobenzene, 70%; (Specific gravity 1.440, 25° C.); Kerosene, 30%. | Bottom——→Top | 120 | 55 | 150 | 7 | 2-2.5 |

Example 16

In this example, still another embodiment in which sol of liquid mixture obtained from phosphoric acid and titanium material is shaped into small balls while its conversion to wet gel is under progress is explained.

In accordance with the method of A of Example 1, a sulfuric acid solution of titanium salt was prepared, of which free sulfuric acid content being adjusted to 10.0 g./100 ml.

To 1000 ml. of this solution (specific gravity 1.40), 50 ml. of JIS 1st grade ortho-phosphoric acid ($H_3PO_4$, 85.0%) was added with agitation at room temperature to form a liquid mixture.

Separately, a granulation tank of 10 l. capacity was filled first with 3 l. of 5% aqueous sulfuric acid and then with 5 l. of a medium formed of trichlorobenzene and kerosene having a specific gravity of about 1.00 which was heated to 110° C., the said tank being provided with stirring blades which were incapable of causing large turbulent flow.

Into that medium the said liquid mixture was poured, while it still retained flowability, through a spray nozzle of 0.3 (mm.)$^2$ sectional area commonly used for painting, at a rate of 170 ml./min.

The sol mixture thus poured in spray form was heated in the liquid medium and converted to minute balls of wet gel having diameters ranging 70–150µ, and caught in the aqueous sulfuric acid at the lower portion.

Thus formed minute spherical gel composed chiefly of titanium phosphate 600 g. was subjected to the metallic impurities extraction step as described in C of Example 1, and washed with water. Whereupon minute spherical wet gel of refined titanium phosphate was obtained.

Substantially no impurities such as V, Fe, Al and Pb was detected in the minute spherical wet gel by emission spectrophotometric analysis. The reflectivities of its calcined product at the indicated wave lengths were as follows, showing that the product had excellent whiteness.

| Reflectivity (%) (wave length mµ): | Titanium phosphate of this example |
|---|---|
| 350 | 51.3 |
| 400 | 100.5 |
| 500 | 100.7 |
| 600 | 101.0 |

Example 17

In this example an embodiment in which the sol of liquid mixture obtained from phosphoric acid and titanium material was shaped into sand-like grains while its gelling is under progress is explained.

A sulfuric acid solution of titanium salt was prepared in the manner as described in A of Example 1, and to 1000 ml. of the solution (specific gravity 1.40), 50 ml. of JIS 1st grade ortho-phosphoric acid ($H_3PO_4$, 85.0%) was added with agitation at room temperature to form a liquid mixture. Before the mixture lost its flowability, it was dropped onto a rotating disc heated to 400° C., whereby obtaining sand-like grains of dry gel of 70–200µ size composed chiefly of titanium phosphate.

Thus formed sand-like dry gel of titanium phosphate 600 g. was subjected to the impurities extraction step as described in C of Example 1 and thereafter washed with water. The resultant sand-like titanium phosphate gel was substantially free of the impurities such as V, Fe, Al and Pb.

Also the calcined product thereof had excellent whiteness, as demonstrated by its reflectivities as follows.

| Reflectivity (%) (wave length mµ): | Titanium phosphate of this example |
|---|---|
| 350 | 32.5 |
| 400 | 98.5 |
| 500 | 99.0 |
| 600 | 99.0 |

Example 18

In this example an embodiment in which the sol of liquid mixture obtained from phosphoric acid and titanium material was shaped into columnar form, while its gelling is under progress is explained.

A sulfuric acid solution of titanium salt was prepared in the manner described in A of Example 1. To 1000 ml. of the same solution (specific gravity 1.40), 50 ml. of JIS 1st grade ortho-phosphoric acid ($H_3PO_4$, 85.0%) was added with agitation at room temperature to form a liquid mixture. While the mixture still retained flowability, the same was poured into a glass tube of 3 mm. diameter and 100 mm. length, and heated to 100° C. for 30 minutes. Whereupon hard gel composed chiefly of titanium phosphate was formed in the glass tube, which was then extruded into the impurities extraction column of C of Example 1 containing aqueous sulfuric acid of pH 0.5. Thus columnar wet gel composed chiefly of titanium phosphate was obtained, from which the impurities were extracted and removed in the manner described in C of Example 1 followed by washing with water. Whereupon refined columnar titanium phosphate gel was obtained.

This titanium phosphate gel was substantially free from metallic impurities, and the calcined product thereof exhibited excellent whiteness as demonstrated by its reflectivities as follows:

| Reflectivity (%) (wave length mµ): | Titanium phosphate of this example |
|---|---|
| 350 | 41.7 |
| 400 | 99.3 |
| 500 | 100.0 |
| 600 | 100.0 |

Example 19

In this example, an embodiment in which the jellied mass composed chiefly of titanium phosphate obtained from phosphoric acid and titanium material was shaped into various forms and removed of metallic impurities is explained.

The jellied mass of wet gel composed chiefly of titanium phosphate prepared in accordance with the method of Example 2 was moulded into dice, columns and flakes of 2–5 mm. grain size by the methods as indicated in Table 9.

Thus moulded wet gels of varied forms composed chiefly of titanium phosphate 600 g. each were subjected to the metallic impurities extraction step as described in C of Example 2 and washed with water to yield granular wet gels of refined titanium phosphate. The results are shown in Table 9.

From the same table it can be understood that regardless the specific form moulded the impurities can be effectively extracted and removed from the granular gel, and the products in all cases exhibit excellent whiteness.

TABLE 9

| Grain configuration | Method of shaping | Amount of washing liquid required (l.) | Impurities contents | | | | Reflectivity of calcined product, percent wavelength (mμ) | | | |
|---|---|---|---|---|---|---|---|---|---|---|
| | | | V | Fe | Al | Pb | 350 | 400 | 500 | 600 |
| Dice | Cutting | 1.2 | | | | | 47.5 | 100.0 | 100.5 | 100.5 |
| Column | Extrusion from round holes | 1.2 | | | | | 52.5 | 100.0 | 100.5 | 100.5 |
| Flake | Scraping | 1.3 | | | | | 44.5 | 99.5 | 100.0 | 100.5 |
| Do | Thermal shrinkage at 100° C. for 10 minutes. | 1.4 | | | | | 51.3 | 100.0 | 100.5 | 100.5 |

Example 20

In this example effect of granulation and grain size on metallic impurities extraction from granular wet gel composed chiefly of titanium phosphate is explained.

The jellied mass of wet gel composed chiefly of titanium phosphate prepared in the manner described in Example 2 was extruded to form granular gels of the sizes indicated in Table 10, followed by about 30 minutes' air-drying.

Those granular gels were thrown into the impurities extraction column of Example 1, and extracted until no impurities ions became detectable in the efflux exhaust in accordance with the method of C of Example 1. Thereafter the granular gels were washed with water to yield granular wet gels of refined titanium phosphate.

As control, the said jellied mass was ground into slurry form without granulation and suction-washed using Buchner funnel. In such method, however, removal of the metallic impurities was very difficult.

The results are shown in Table 10.

From the same table, it is clear that when jellied mass composed chiefly of titanium phosphate is formed and the same is moulded into grains in accordance with the subject process, extraction and removal therefrom of the metallic impurities can be performed with ease.

It can also be understood that particularly when the grain size is 1.5–5.0 mm. diameter, the extraction of the impurities can be performed within considerably short time.

Titanium salt solutions of minor free acid contents having the compositions as given in Table 11 were prepared in the manner described in the foregoing Example 11, to which phosphoric acid was added as described also in Example 11 to form sol mixtures. The mixtures were shaped into flaky gels composed chiefly of titanium phosphate in the manner described in Example 1, followed by a sulfuric acid washing treatment (pH 0.5) of Example 1 and water-washing.

The test results of the titanium phosphate gels obtained by this first stage acid treatment are given in Table 11. By this first stage treatment, Fe, Al and Pb among the impurities were substantially completely removed, but due to the low free acid content vanadium component remained in the gels to impart yellow or green color to the product.

Then the gels were again thrown into the glass cylinder of Example 1 to be subjected to the second stage acid treatment employing sulfuric acid or hydrochloric acid of the concentration and temperature as indicated in Table 11. Whereupon the vanadium in the titanium phosphate gel was extracted into the acid and refined gels of titanium phosphate were obtained.

The results are shown in Table 11. Thus with the two-stage acid treatment of this example, titanium phosphate

TABLE 10

| Extraction and removal of metallic impurities | | Product wet gel | | | | | | | | |
|---|---|---|---|---|---|---|---|---|---|---|
| | Amount of washing liquid required (l.) | Time (hr., min.) | Impurities contents | | | | Reflectivity of calcined product, percent (wavelength mμ) | | | |
| | | | V | Fe | Al | Pb | 350 | 400 | 500 | 600 |
| Grain size (diameter, mm.): | | | | | | | | | | |
| 1.5 | 1.2 | 5, 45 | | | | | 50.5 | 100.5 | 100.5 | 100.5 |
| 3.0 | 1.4 | 6, 40 | | | | | 52.5 | 100.0 | 100.5 | 100.5 |
| 5.0 | 1.7 | 7, 10 | | | | | 55.0 | 100.0 | 100.0 | 100.0 |
| 10.0 | 2.6 | 12, 30 | | | | | 42.0 | 98.5 | 98.5 | 98.5 |
| 20.0 | 6.0 | 29, 00 | | | | | 45.0 | 98.0 | 98.5 | 98.5 |
| Slurry | 56.0 | (1) | ++ | ++ | ++ | ++ | (2) | | | |

[1] One week after the washing still considerable amount of impurities ions were detected in the washing, the iron content removed by the end of the week being only 75.0%.
[2] The titanium phosphate obtained by calcination was yellowish brown with the impurities, and therefore its reflectivities as the norm of whiteness was not measured.

Example 21

In this example, an embodiment in which the gel composed chiefly of titanium phosphate is subjected to two-stage acid-washing treatment is explained.

gels of little impurities content and excellent whiteness were obtained, and furthermore whereby it is possible to recover the vanadium in the titanium phosphate in pure form at considerably high concentration.

Example 22

By this example, it is illustrated that the metallic impurities are extractable using varied extracting agents.

According to the method of Example 1, sol composed chiefly of titanium phosphate was prepared, which was shaped into flaky wet gel of 2 mm. thickness.

Then the flaky gel was washed in a glass cylinder in the manner described in C of Example 1, except that varied extracting agent was used under varied treating conditions as indicated in Table 12.

The results are also shown in the same table.

TABLE 11

| Main components of starting titanium salt solution (g./100 ml.) | | | | Gel after the first stage acid treatment | | | | | | | | Second stage acid treatment | | | | Gel after the second stage acid treatment | | | | | | | |
|---|---|---|---|---|---|---|---|---|---|---|---|---|---|---|---|---|---|---|---|---|---|---|---|
| TiO₂ | V | F.A. | State | Reflectivity of calcined product, percent (wavelength mμ) | | | | Impurities contents | | | | Temp. (°C.) | Type of acid | Acid concentration (g./100 ml.) | Amount of acid¹ (l.) | Yield, percent | Reflectivity of calcined product, percent (wavelength mμ) | | | | Impurities contents | | | |
| | | | | 350 | 400 | 500 | 600 | V | Fe | Al | Pb | | | | | | 350 | 400 | 500 | 600 | V | Fe | Al | Pb |
| 8.55 | 0.045 | H₂SO₄, 10.0 | White | 50.5 | 100.5 | 100.5 | 100.0 | | | | | 95±5 | Sulfuric acid | 30 | 1.2 | 99.0 | 64.5 | 101.5 | 102.5 | 102.5 | | | | |
| 8.55 | 0.045 | H₂SO₄, 2.20 | Light green | 15.5 | 67.0 | 89.0 | 89.0 | + | | | | 95±5 | ...do | 30 | 1.2 | 94.5 | 59.5 | 100.5 | 100.5 | 100.5 | | | | |
| 8.55 | 0.045 | H₂SO₄, 3.0 | ...do | 16.5 | 69.0 | 91.0 | 91.0 | + | | | | 95±5 | Hydrochloric acid | 20 | 1.2 | 95.0 | 58.0 | 100.5 | 101.0 | 101.0 | | | | |
| 4.75 | 0.245 | H₂SO₄, 1.50 | ...do | 16.5 | 67.0 | 87.5 | 87.5 | + | + | | | 95±5 | ...do | 50 | 1.5 | 93.0 | 48.0 | 100.0 | 100.5 | 100.5 | | | | |
| 20.7 | 0.140 | H₂SO₄, 3.0 | Light yellow | 20.5 | 83.0 | 92.0 | 92.0 | + | + | | | 95±5 | Sulfuric acid | 30 | 1.7 | 94.0 | 55.0 | 100.0 | 100.5 | 100.5 | | | | |
| 20.7 | 0.140 | H₂SO₄, 3.0 | ...do | 20.5 | 83.0 | 92.0 | 92.5 | + | + | | | 95±5 | ...do | 30 | 1.7 | 94.0 | 52.5 | 100.5 | 100.5 | 100.5 | | | | |
| 4.03 | 0.021 | HCl, 2.5 | Light green | 15.5 | 68.0 | 90.0 | 90.5 | + | + | | | 95±5 | Hydrochloric acid | 20 | 1.2 | 95.0 | 58.5 | 101.0 | 101.5 | 101.5 | | | | |

¹ Amount of the acid used for treating 600 g. of wet titanium phosphate gel.

TABLE 12

| Extracting agent and its concentration | Extraction condition | | | Wet gel product | | | | | | | Reflectivity of calcined product, percent (wavelength mμ) | | | |
|---|---|---|---|---|---|---|---|---|---|---|---|---|---|---|
| | Temp. (°C.) | Amount of extracting agent (l.)¹ | Time (approximate number of hours) | Composition (TiO₂:P₂O₅) | Yield, percent | Impurities contents | | | | | 350 | 400 | 500 | 600 |
| | | | | | | V | Fe | Al | Pb | | | | | |
| Aqueous hydrochloric acid (1.0%) | 20 | 1.2 | 6 | 3.7:1 | 98.5 | | | | | | 47.8 | 100.0 | 100.5 | 100.5 |
| Aqueous nitric acid (0.5%) | 20 | 1.2 | 6 | 3.7:1 | 98.4 | | | | | | 49.3 | 100.5 | 100.0 | 100.5 |
| Aqueous acetic acid (30.0%) | 10 | 1.2 | 7 | 3.2:1 | 99.0 | | | | | | 51.4 | 100.0 | 100.0 | 100.5 |
| Aqueous oxalic acid (10.0%) | 50 | 1.2 | 6 | 3.4:1 | 99.0 | | | | | | 48.8 | 100.0 | 100.0 | 100.5 |
| Water | 20 | 1.2 | 8 | 3.1:1 | 99.3 | ± | ± | | | | 20.7 | 76.6 | 95.5 | 95.5 |
| Aqueous caustic soda² (5%) | 20 | {1.2, 1.8} | {8, 10} | (⁴) | 99.2 | | | | | | 23.8 | 93.0 | 100.0 | 100.5 |
| (1) aqueous caustic soda² (5%); (2) aqueous sulfuric acid (5%) plus aqueous NaHSO₃ (0.1%) | 20 | | 15 | (⁴) | 85.7 | | | | | | 35.2 | 93.4 | 98.0 | 98.0 |
| Acetone³ | 10 | 2.4 | 5 | 3.1:1 | 99.3 | + | + | + | | | 15.5 | 68.5 | 95.0 | 85.0 |
| Methanol solution of sulfuric acid (5%) | 10 | 1.5 | 6 | 3.1:1 | 99.1 | | | | | | 47.2 | 100.0 | 100.5 | 100.5 |
| Tri-n-butyl-phosphate | 10 | | | 3.2:1 | 98.4 | | | | | | 28.8 | 92.0 | 98.0 | 98.0 |

¹ The amount of extracting agent is that required for treating 600 g. of the flaky wet gel of titanium phosphate.
² In accordance with Example 8, columnar titanium phosphate gel prepared from the reagent titanium tetrachloride was used. The same gel was completely removed of metallic impurities such as V, Fe and Al, when it was further subjected to the two-stage acid treatment as in Example 21, or to an acid treatment in reducing atmosphere.
³ Upon subjecting this titanium phosphate gel further to the two stage acid treatment as in Example 21, metallic impurities such as V, Fe and Al were completely removed.
⁴ Substantially no P₂O₅.

Example 23

In this example, adjusting of TiO₂:P₂O₅ mol ratio in titanium phosphate is explained.

The substantially refined titanium phosphate gels prepared in accordance with Example 12 having TiO₂:P₂O₅ ratio of respectively 7.3:1 and 1.9:1 were treated under the following conditions.

(I) Treatment of gel of which TiO₂:P₂O₅ mol ratio is 7.3:1.—The said titanium phosphate gel 100 g. was immersed in 300 ml. of 20% aqueous phosphoric acid, and left therein for an hour at 90° C., followed by washing with water. Then the titanium phosphate gel of which phosphoric acid component was adjusted was calcined at 900° C. for an hour. The calcined product had whiteness considerably superior to that of the titanium phosphate before the adjustment of mol ratio.

| Reflectivity, percent | Untreated titanium phosphate— $TiO_2:P_2O_5$ 7.3:1 Calcined product | Titanium phosphate with adjusted mol ratio $TiO_2:P_2O_5$ 2.2:1 Dried product | Calcined product |
|---|---|---|---|
| Wave length (mμ): | | | |
| 350 | 59.5 | 53.7 | 68.0 |
| 400 | 98.0 | 100.0 | 102.5 |
| 500 | 99.0 | 100.5 | 103.0 |
| 600 | 99.0 | 100.5 | 103.0 |

(II) Treatment of gel of which $TiO_2:P_2O_5$ mol ratio is 1.9:1.—Substantially refined above titanium phosphate gel about 600 g. was thrown into the glass cylinder of Example 1 filled with 1.0% aqueous caustic soda which was heated to 40° C. in advance. Thereafter at the rate of 3.5 ml. per minute the same alkaline liquid was added to the cylinder from the top, and the equal amount was withdrawn from the bottom of the cylinder, the operation being continued for 200 minutes. Then the gel was washed with water. As the result its phosphoric acid portion was partly removed, making its $TiO_2:P_2O_5$ mol ratio 9.5:1.

The pH of this alkali-treated titanium phosphate gel was 6.7, when measured in the manner described in the note of Example 12.

The whiteness of the ground, dry gel of the titanium phosphate with the adjusted $TiO_2:P_2O_5$ mol ratio was as follows.

Wave length (mμ):      Reflectively (percent)
350 ------------------------------------- 21.5
400 ------------------------------------- 74.0
500 ------------------------------------- 98.5
600 ------------------------------------- 98.5

This pH-adjusted titanium phosphate gel can be used as it is, in the wet state, as filler for paper making and white pigment of aqueous paint. Furthermore it can be used as filler and delusterant for synthetic resin, rubber and synthetic fiber.

Example 24

In this example, preparation of titanium hydroxide and titanium oxide from titanium phosphate gel is explained.

Substantially refined columnar wet gel of titanium phosphate obtained by the method of Example 2, 600 g., was packed in the glass cylinder, described in Example 1, with about 800 ml. of 5% aqueous NaOH solution and to which 5% aqueous NaOH solution of 20° C. was fed at the rate of 3.5 ml./min. from the top of the cylinder.

The operation was continued for 8 hours under the above conditions. Whereupon almost completely dephosphorized titanium hydroxide gel was formed, which is useful as high purity starting material of varied titanium compounds preparation, particularly titanium tetrachloride or organic derivatives of titanium.

Then the same titanium hydroxide was calcined at 900° C. for an hour, producing high purity titanium oxide of excellent whiteness as shown below.

| | Titanium hydroxide | Titanium oxide |
|---|---|---|
| Impurities content: | | |
| V | | |
| Fe | | |
| Al | | |
| Pb | | |
| Reflectivity, percent, wave-length (mμ): | | |
| 350 | 20.7 | 21.5 |
| 400 | 75.0 | 80.3 |
| 500 | 98.7 | 99.5 |
| 600 | 98.7 | 99.7 |

We claim:
1. A process for the preparation of titanium salts substantially free of metallic impurities having a noticeable effect on the color tone of the titanium salt product from a titanium material selected from the group consisting of
   (a) gaseous or liquid titanium salts,
   (b) amorphous oxides of titanium, and
   (c) solutions of the same in a material selected from
      (1) inorganic mineral acids other than phosphorous oxoacids,
      (2) organic carboxylic acids,
      (3) organic sulfonic acids, and
      (4) aqueous solutions thereof;
which comprises reacting said titanium material, in the presence of water, with a phosphorus oxoacid or a derivative thereof capable of releasing phophorus oxoacid anions in the reaction system to thereby form a gel of a titanium salt of said phosphorus oxoacid, said gel containing substantially all of said titanium salt of said phosphorus oxoacid; molding said gel into homogeneous small masses without filtration; and thereafter extracting said homogeneous small masses with a neutral or acidic aqueous medium to remove said metallic impurities therefrom.

2. A process for the preparation of titanium salts substantially free of metallic impurities having a noticeable effect on the color tone of the titanium salt product from a titanium material selected from the group consisting of
   (a) gaseous or liquid titanium salts,
   (b) amorphous oxides of titanium, and
   (c) solutions of the same in a material selected from
      (1) inorganic mineral acids other than phosphorus oxoacids,
      (2) organic carboxylic acids,
      (3) organic sulfonic acids, and
      (4) aqueous solutions thereof;
which comprises reacting said titanium material, in the presence of water, with a phosphorus oxoacid or a derivative thereof capable of releasing phosphorus oxoacid anions in the reaction system, to thereby form a sol of a titanium salt of said phosphorus oxoacid; molding said sol into homogeneous small masses without filtration; converting said small masses of sol into small masses of gel; and thereafter extracting said small masses of gel with a neutral or acidic aqueous medium to remove metallic impurities therefrom.

3. A process for the preparation of titanium salts substantially free of metallic impurities having a noticeable effect on the color tone of the titanium salt product from a titanium material selected from the group consisting of
   (a) gaseous or liquid titanium salts,
   (b) amorphous oxides of titanium, and
   (c) solutions of the same in a material selected from
      (1) inorganic mineral acids other than phosphorus oxoacids,
      (2) organic carboxylic acids,
      (3) organic sulfonic acids, and
      (4) aqueous solutions thereof;
which comprises reacting said titanium material, in the presence of water, with a phosphorus oxoacid or a derivative thereof capable of releasing phosphorus oxoacid anions in the reaction system to thereby form a slurry consisting of a free liquid and a gel containing substantially all of the titanium salt of said phosphorus oxoacid produced from the reaction; heating the slurry to evaporate the free liquid to form a uniform gel; molding said uniform gel into homogeneous small masses without filtration; and thereafter extracting said homogeneous small masses with a neutral or acidic aqueous medium to remove said metallic impurities therefrom.

4. The process of claim 1 in which the titanium material is mixed with phosphorus oxoacid or derivative thereof which can release phosphorus oxoacid radical under the reaction conditions, at such a ratio that 0.2–6 atomic equivalents of phosphorus per atom of titanium is present in the resultant mixture.

5. The process of claim 1 in which the titanium material is prepared by elution of titanium ore into aqueous sulfuric acid.

6. The process of claim 1 in which the titanium material is amorphous oxide of titanium prepared by the steps of elution of titanium ore into aqueous sulfuric acid and following hydrolysis of the solution.

7. The process of claim 1 in which the phosphorus oxoacid is phosphoric acid.

8. The process of claim 1 in which the extraction of the metallic impurities from the granular gel is performed in aqueous solution of mineral acid.

9. The process of claim 2 in which the titanium material is mixed with phosphorus oxoacid or derivative thereof which can release phosphorus oxoacid radical under the reaction conditions, at such a ratio that 0.2–6 atomic equivalents of phosphorus per atom of titanium is present in the resultant mixture.

10. The process of claim 2 in which the sol is moulded while its gelling is under progress, by feeding or spraying the sol into an immiscible liquid medium, heated gaseous atmosphere or onto heated plate as streamlet or drops.

References Cited

UNITED STATES PATENTS

| | | | |
|---|---|---|---|
| 3,056,647 | 10/1962 | Amphlett et al. | 23—14.5 |
| 3,104,950 | 9/1963 | Ellis | 23—202 |
| 3,341,291 | 9/1967 | Mabbs et al. | 23—202 |

OTHER REFERENCES

J. Barksdale, Titanium—Its Occurrence, Chemistry, and Technology, 1966, pages 112–113, The Ronald Press Company, New York.

OSCAR R. VERTIZ, Primary Examiner

LUTHER A. MARSH, Assistant Examiner

U.S. Cl. X.R.

23—309